US011799293B2

(12) United States Patent
Chen et al.

(10) Patent No.: US 11,799,293 B2
(45) Date of Patent: Oct. 24, 2023

(54) HIGH-VOLTAGE DC TRANSFORMATION APPARATUS AND POWER SYSTEM AND CONTROL METHOD THEREOF

(71) Applicant: Delta Electronics (Shanghai) Co., Ltd., Shanghai (CN)

(72) Inventors: Li Chen, Shanghai (CN); Changyong Wang, Shanghai (CN); Yansong Lu, Shanghai (CN); Aibin Qiu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 54 days.

(21) Appl. No.: 17/190,718

(22) Filed: Mar. 3, 2021

(65) Prior Publication Data

US 2021/0281183 A1  Sep. 9, 2021

(30) Foreign Application Priority Data

Mar. 9, 2020 (CN) .......................... 202010157592.3

(51) Int. Cl.
*H02J 3/36* (2006.01)
*H02M 3/335* (2006.01)
(Continued)

(52) U.S. Cl.
CPC .............. *H02J 3/36* (2013.01); *H02J 3/381* (2013.01); *H02M 3/33569* (2013.01);
(Continued)

(58) Field of Classification Search
CPC ........ H02J 3/36; H02J 3/381–388; H02J 5/00; H02J 2300/28; H02J 2300/40;
(Continued)

(56) References Cited

U.S. PATENT DOCUMENTS 10,116,159 B1  10/2018  Li et al.
10,404,181 B2  9/2019  Zhou et al.
(Continued)

FOREIGN PATENT DOCUMENTS

CN  102064702 A  5/2011
CN  103219740 A  7/2013
(Continued)

OTHER PUBLICATIONS

Machine translation of WO 2018/172506 A1 (Brombach). Orig. published Sep. 27, 2018. (Year: 2018).*
(Continued)

*Primary Examiner* — Fred E Finch, III
(74) *Attorney, Agent, or Firm* — KIRTON McCONKIE; Evan R. Witt

(57) ABSTRACT

A high-voltage DC transformation apparatus, a power system and a control method of the power system. The high-voltage DC transformation apparatus is electrically connected to at least one high-voltage DC power generator. The high-voltage DC transformation apparatus includes at least one bidirectional AC/DC conversion module, at least one first transformer and at least one unidirectional rectifier module. A DC terminal of the bidirectional AC/DC conversion module is electrically connected to the corresponding high-voltage DC power generator. The first transformer includes a first transmission terminal and a second transmission terminal. The first transmission terminal is electrically connected to an AC terminal of the corresponding bidirectional AC/DC conversion module. The unidirectional rectifier module includes an input terminal and an output terminal. The input terminal is electrically connected to the second transmission terminal of the corresponding first transformer, and the output terminal is electrically connected to a high-voltage grid.

24 Claims, 26 Drawing Sheets

(51) Int. Cl.
*H02J 3/38* (2006.01)
*H02M 1/00* (2006.01)

(52) U.S. Cl.
CPC ........... *H02J 3/388* (2020.01); *H02J 2300/28* (2020.01); *H02J 2310/18* (2020.01); *H02M 1/0074* (2021.05)

(58) Field of Classification Search
CPC ........... H02J 2310/18; H02M 3/33569; H02M 1/007; H02M 7/483; H02M 7/4835
See application file for complete search history.

(56) References Cited

U.S. PATENT DOCUMENTS

| | | | |
|---|---|---|---|
| 2012/0139350 | A1 | 6/2012 | Wang |
| 2013/0076293 | A1 | 3/2013 | Chen et al. |
| 2017/0009744 | A1* | 1/2017 | Brogan .................. G05F 1/455 |
| 2018/0342875 | A1* | 11/2018 | Ganireddy .............. H02M 5/42 |
| 2020/0059102 | A1* | 2/2020 | Brombach .............. H02J 1/102 |
| 2022/0045516 | A1* | 2/2022 | Rosso ...................... H02J 3/16 |

FOREIGN PATENT DOCUMENTS

| | | | |
|---|---|---|---|
| CN | 203398807 | U | 1/2014 |
| CN | 103986339 | A | 8/2014 |
| CN | 104242341 | A | 12/2014 |
| CN | 204145305 | U | 2/2015 |
| CN | 104410095 | B | 11/2015 |
| CN | 105790305 | A | 7/2016 |
| CN | 103891121 | B | 11/2016 |
| CN | 107026463 | A | 8/2017 |
| CN | 107294130 | A | 10/2017 |
| CN | 104917393 | B | 2/2018 |
| CN | 105262125 | B | 2/2018 |
| CN | 108134409 | A | 6/2018 |
| CN | 108631293 | A | 10/2018 |
| CN | 108988667 | A | 12/2018 |
| CN | 109004836 | A | 12/2018 |
| CN | 109103911 | A | 12/2018 |
| CN | 109217687 | A | 1/2019 |
| CN | 109742780 | A | 5/2019 |
| CN | 209298898 | U | 8/2019 |
| CN | 110247421 | A | 9/2019 |
| CN | 110266034 | A | 9/2019 |
| CN | 110460101 | A | 11/2019 |
| CN | 110768240 | A | 2/2020 |
| CN | 110829479 | A | 2/2020 |
| EP | 2919354 | A1 | 9/2015 |
| JP | 2014176163 | A | 9/2014 |
| SE | 1750290 | A1 | 4/2017 |
| TW | 201220632 | A | 5/2012 |
| TW | 201308817 | A | 2/2013 |
| TW | 201315094 | A | 4/2013 |
| TW | 201806279 | A | 2/2018 |
| TW | 201820735 | A | 6/2018 |
| WO | 2014026840 | A2 | 2/2014 |
| WO | WO-2018172506 | A1 * | 9/2018 ............. F03D 9/257 |

OTHER PUBLICATIONS

Machine translation of CN 110768240 A (Chen). Orig. published Feb. 7, 2020. (Year: 2020).*
Research on Control Technology of Applying Storage-Based Farm as Black-Start Power Source for Power Grid, Jun. 2017.
Guan Zhou et al., Modular Multilevel DC Transformer for DC Distribution Application Based on Extended Phase-Shift Control, Transactions of China Electrotechnical Society, Jul. 2019, pp. 2770-2781, vol. 34, No. 13.
Research on Multilevel Converter for Direct Drive Wind Power System, Journal of Northeast Dianli University, vol. 30, No. 1, Feb. 2010.

* cited by examiner

US 11,799,293 B2

HIGH-VOLTAGE DC TRANSFORMATION APPARATUS AND POWER SYSTEM AND CONTROL METHOD THEREOF

CROSS-REFERENCE TO RELATED APPLICATION

This application claims priority to China Patent Application No. 202010157592.3, filed on Mar. 9, 2020, the entire contents of which are incorporated herein by reference for all purposes.

FIELD OF THE INVENTION

The present disclosure relates to a power transformation apparatus, and more particularly to a high-voltage DC (direct current) transformation apparatus and a power system employing the same, and a control method of the power system.

BACKGROUND OF THE INVENTION

With the rapid development of new energy power generation technologies, various power systems are gradually connected to the electric grid. Before the power system is connected to the AC grid, long-distance AC cables must be used to perform long-distance power transmission. Consequently, the transmission efficiency is low, and the cost is high.

At present, in some power systems, such as some offshore wind farms, the distance between the wind turbine and the onshore substation is very far. For reducing the transmission loss and the cost, the wind turbine is connected to the high-voltage DC transformation apparatus first to boost the DC power and adopt high-voltage DC electric power transmission.

Therefore, there is a need of providing a high-voltage DC transformation apparatus and a power system and a control method thereof in order to overcome the drawbacks of the conventional technologies.

SUMMARY OF THE INVENTION

The present disclosure provides a high-voltage DC transformation apparatus, a power system and a control method of the power system. The electric power generated by the power generator is boosted so that the long-distance power transmission can be performed based on the high-voltage DC power. Consequently, the transmission loss and the cost are reduced.

In accordance with an aspect of the present disclosure, a high-voltage DC transformation apparatus is provided. The high-voltage DC transformation apparatus is electrically connected to at least one high-voltage DC power generator. The high-voltage DC transformation apparatus includes at least one bidirectional AC/DC conversion module, at least one first transformer and at least one unidirectional rectifier module. A DC terminal of the bidirectional AC/DC conversion module is electrically connected to the corresponding high-voltage DC power generator. Each of the at least one first transformer includes a first transmission terminal and a second transmission terminal. The first transmission terminal is electrically connected to an AC terminal of the corresponding bidirectional AC/DC conversion module. Each of the at least one unidirectional rectifier module includes an input terminal and an output terminal. The input terminal is electrically connected to the second transmission terminal of the corresponding first transformer, and the output terminal is electrically connected to a high-voltage grid.

In accordance with another aspect of the present disclosure, a power system is provided. The power system includes at least one high-voltage DC power generator and a high-voltage DC transformation apparatus.

In accordance with a further aspect of the present disclosure, a control method of a power system is provided. The power system includes at least one high-voltage DC power generator and a high-voltage DC transformation apparatus electrically connected to the at least one high-voltage DC power generator. The high-voltage DC transformation apparatus includes at least one bidirectional AC/DC conversion module, at least one first transformer and at least one unidirectional rectifier module. The control method includes the following steps. Firstly, a first DC voltage outputted by the high-voltage DC power generator is converted into a first AC voltage by the bidirectional AC/DC conversion module. Then, the first AC voltage is boosted to a second AC voltage by the first transformer. Finally, the second AC voltage is rectified by the unidirectional rectifier module to generate a second DC voltage.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
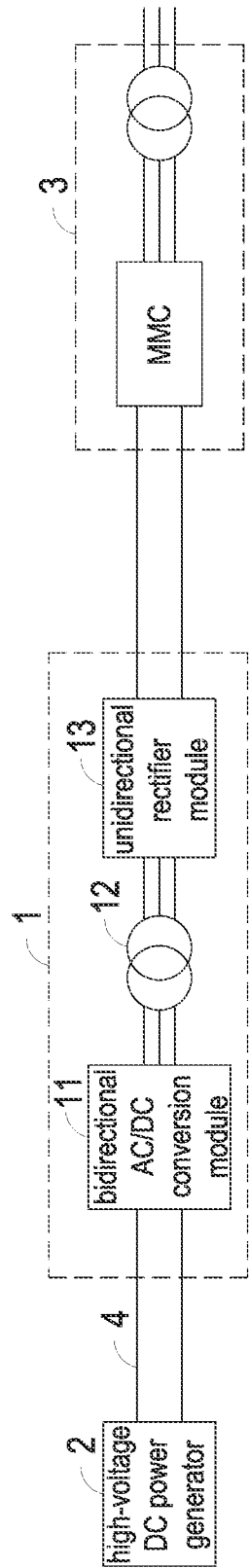
FIG. 1A is a schematic circuit diagram illustrating a high-voltage DC transformation apparatus according to a first embodiment of the present disclosure.

FIG. 1A is a schematic circuit diagram illustrating a high-voltage DC transformation apparatus according to a first embodiment of the present disclosure. As shown in FIG. 1A, the high-voltage DC transformation apparatus 1 is electrically connected to at least one high-voltage DC power generator 2 and a high-voltage grid 3. The high-voltage DC transformation apparatus 1 converts the electric power generated by the high-voltage DC power generator 2 into a high-voltage DC power and transmits the high-voltage DC power to the high-voltage grid 3. The high-voltage DC power generator 2 is electrically connected to the high-voltage DC transformation apparatus 1 through a DC transmission grid 4. The high-voltage DC transformation apparatus 1 includes at least one bidirectional AC/DC conversion module 11, at least one first transformer 12 and at least one unidirectional rectifier module 13. The DC terminal of the bidirectional AC/DC conversion module 11 is electrically connected to the high-voltage DC power generator 2. The bidirectional AC/DC conversion module 11 receives a first DC voltage outputted by the high-voltage DC power generator 2, and converts the first DC voltage into a first AC voltage. Preferably, the first AC voltage is a three-phase AC voltage. The first transformer 12 includes a first transmission terminal and a second transmission terminal. The first transmission terminal is electrically connected to an AC terminal of the bidirectional AC/DC conversion module 11 for receiving the first AC voltage. The first transformer 12 boosts the first AC voltage and outputs a second AC voltage at the second transmission terminal. Preferably, the second AC voltage is a three-phase AC voltage. The unidirectional rectifier module 13 includes an input terminal and an output terminal. The input terminal of the unidirectional rectifier module 13 is electrically connected to the second transmission terminal of the first transformer 12 for receiving the second AC voltage. The unidirectional rectifier module 13 rectifies the second AC voltage and outputs a second DC voltage at the output terminal. The unidirectional rectifier module 13 is for example but not limited to an uncontrolled diode rectifier, a rectifier including silicon controlled components or a Vienna rectifier. In an embodiment, the unidirectional rectifier module 13 includes a Vienna rectifier and a second controller. The second controller is electrically connected to the Vienna rectifier for controlling the switching operation of the Vienna rectifier, thereby adjusting the voltage on the input terminal of the unidirectional rectifier module 13.

According to the above descriptions, in the high-voltage DC transformation apparatus 1 of the present disclosure, the bidirectional AC/DC conversion module 11 converts the DC power outputted by the high-voltage DC power generator 2 into the AC power, the first transformer 12 boosts the AC power, and the unidirectional rectifier module 13 rectifies the boosted AC power into a high-voltage DC power. Consequently, the long-distance power transmission is performed based on the high-voltage DC power, and the transmission loss and the cost can be reduced.

In some embodiments, the power system shown in FIG. 1A is applied to an offshore wind power project, and the high-voltage DC power generator 2 is a power generator in a wind power plant. The wind power generator generates the high-voltage DC power (e.g., 30 kV or 60 kV). The high-voltage DC power is transmitted to the offshore high-voltage DC substation through the high-voltage DC transmission grid. The offshore high-voltage DC substation boosts the received DC voltage to a higher voltage level (e.g., 150 KV), and transmits the boosted DC voltage to the onshore substation through a long distance.

In an embodiment, the frequency of the first transformer 12 is larger than 50 Hz, such as 60 HZ, 400 HZ, etc., so that the volume and cost of the transformer can be reduced by increasing the frequency of the transformer. Further, by increasing the frequency of the transformer, the volume and cost of the components inside the bidirectional AC/DC conversion module 11, which is electrically connected to the first transformer 12, can be reduced as well, such as reducing volume and cost of the components like inductors and capacitors. In an embodiment, the unidirectional rectifier module 13 includes a unidirectional rectifier, the unidirectional rectifier includes at least one bridge arm, and each bridge arm is formed by a plurality of diodes or half-controlled power components connected in series.

Figure 1B:
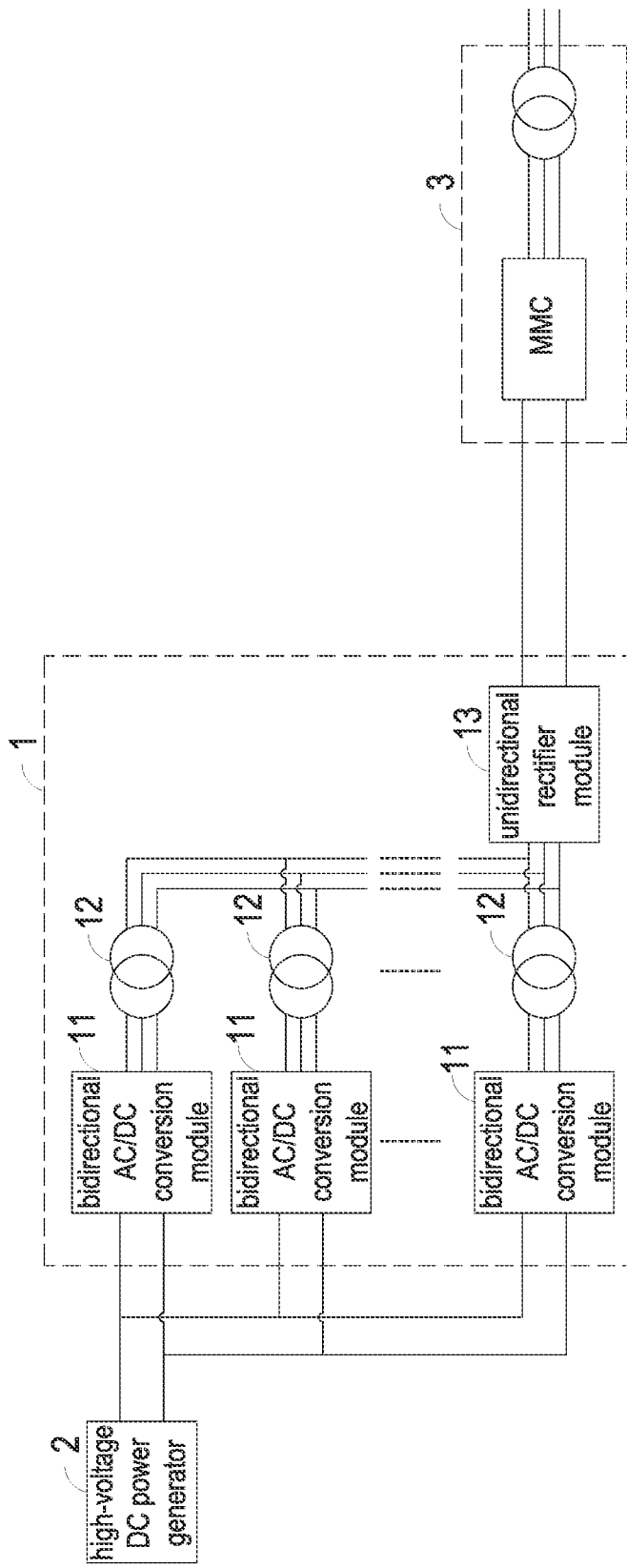
FIG. 1B is a schematic circuit diagram illustrating a high-voltage DC transformation apparatus according to a second embodiment of the present disclosure.

FIG. 1B is a schematic circuit diagram illustrating a high-voltage DC transformation apparatus according to a second embodiment of the present disclosure. In comparison with the embodiment of FIG. 1A, the high-voltage transformation apparatus 1 of this embodiment includes a plurality of bidirectional AC/DC conversion modules 11 and a plurality of first transformers 12. The DC terminals of the plurality of bidirectional AC/DC conversion modules 11 are electrically connected together in parallel and then electrically connected to the high-voltage DC power generator 2. The plurality of bidirectional AC/DC conversion modules 11 are corresponding to the plurality of first transformers 12 in one-to-one ratio, and the AC terminal of each bidirectional AC/DC conversion module 11 is electrically connected to the first transmission terminal of the corresponding first transformer 12. Alternatively, the plurality of first transformers 12 in this embodiment may be integrated into a multi-winding transformer, namely the first transmission end of the first transformer 12 includes a plurality of windings, and each winding is electrically connected to the corresponding bidirectional AC/DC conversion module 11. When the generation power of the high-voltage DC power generator 2 is large, the configuration of this embodiment may be utilized.

Figure 1C:
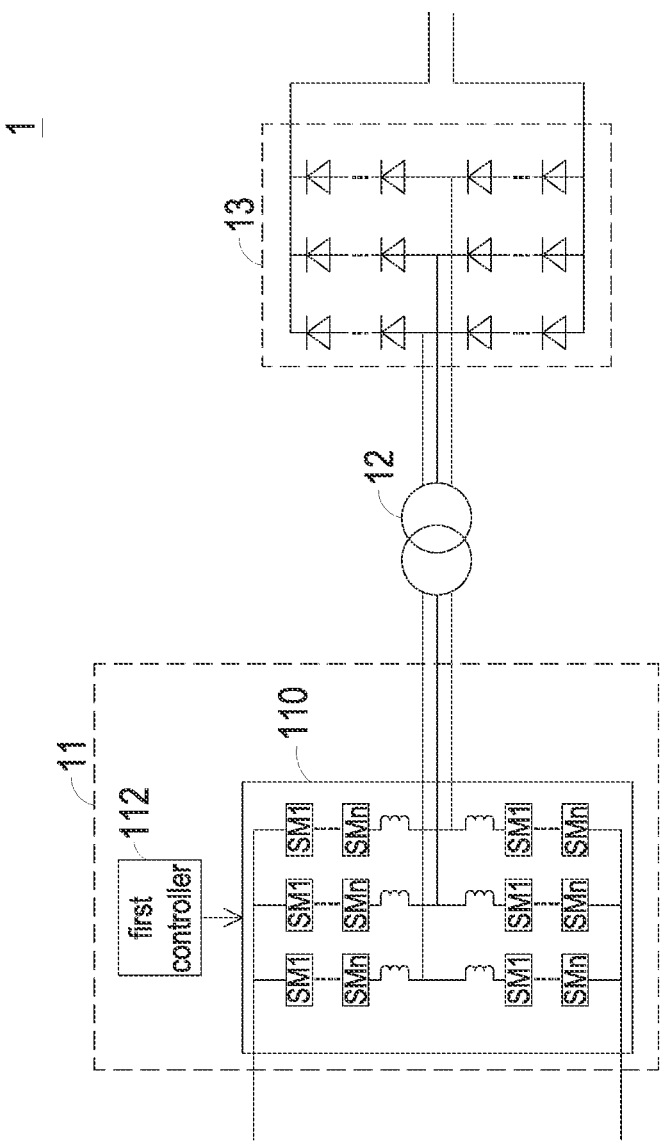
FIG. 1C is a schematic circuit diagram illustrating the detailed circuitry structure of the high-voltage DC transformation apparatus shown in FIG. 1A.

FIG. 1C is a schematic circuit diagram illustrating the detailed circuitry structure of the high-voltage DC transformation apparatus shown in FIG. 1A. Please refer to FIG. 1C and FIG. 1A. In this embodiment, the bidirectional AC/DC conversion module 11 includes a modular multilevel converter (MMC) 110 and a first controller 112. The modular multilevel converter 110 includes a plurality of bridge arms, such as three bridge arms. Each bridge arm includes a plurality of serially connected switch modules SM. The first controller 112 is electrically connected to the modular multilevel converter 110 for controlling the switching operation of the modular multilevel converter 110. Each of the first transmission terminal and the second transmission terminal of the first transformer 12 has a single winding. The winding at the first transmission terminal of the first transformer 12 is electrically connected to the modular multilevel converter 110. The input terminal of the unidirectional rectifier module 13 is electrically connected to the winding at the second transmission terminal of the first transformer 12. The unidirectional rectifier module 13 includes a plurality of bridge arms. In this embodiment, the unidirectional rectifier module 13 includes three bridge arms. Each bridge arm of the unidirectional rectifier module 13 is formed by a plurality of rectification elements, and the rectification element is for example but not limited to a diode or a silicon controlled component. For example, each bridge arm of the unidirectional rectifier module 13 is formed by four or more diodes or half-controlled components connected in series. Accordingly, the voltage withstanding level of each rectification element can be reduced, and the cost for the rectification elements is reduced. It is noted that the circuitry structures of the modular multilevel converter 110 and the unidirectional rectifier module 13 are not restricted to those as shown in FIG. 1C. That is, the circuitry structures of the modular multilevel converter 110 and the unidirectional rectifier module 13 may be varied according to the practical requirements. For example, in another embodiment, the unidirectional rectifier module 13 includes a Vienna rectifier to replace the uncontrolled rectifier. Alternatively, the bidirectional AC/DC conversion module 11 includes a plurality of converters to replace the modular multilevel converter (MMC).

Figure 2:
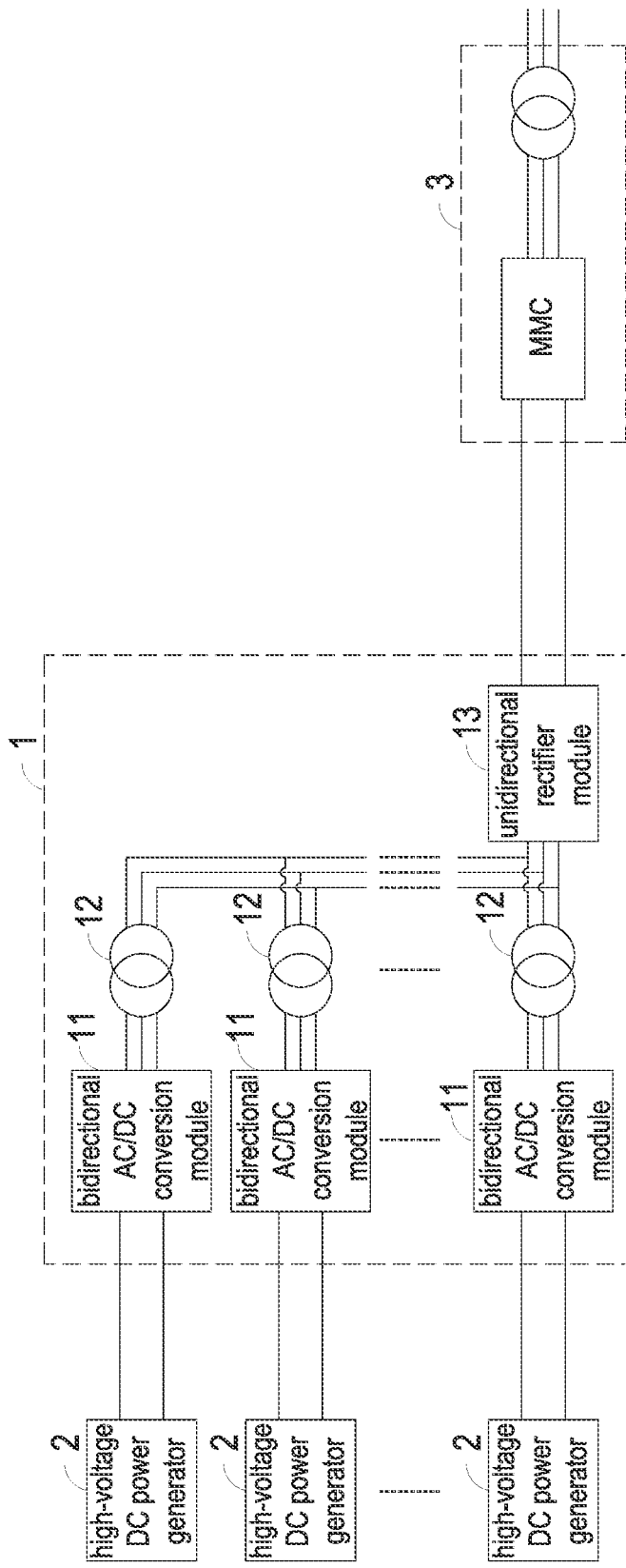
FIG. 2 is a schematic circuit diagram illustrating a high-voltage DC transformation apparatus according to a third embodiment of the present disclosure.

FIG. 2 is a schematic circuit diagram illustrating a high-voltage DC transformation apparatus according to a third embodiment of the present disclosure. As shown in FIG. 2, in this embodiment, the high-voltage DC transformation apparatus 1 includes a plurality of bidirectional AC/DC conversion modules 11, a plurality of first transformers 12 and one unidirectional rectifier module 13. The DC terminal of each bidirectional AC/DC conversion module 11 is electrically connected to the corresponding high-voltage DC power generator 2. The AC terminal of each bidirectional AC/DC conversion module 11 is electrically connected to the first transmission terminal of the corresponding first transformer 12. The second transmission terminals of the plurality of first transformers 12 are electrically connected together in parallel and then electrically connected to the input terminal of the unidirectional rectifier module 13.

Figure 3:
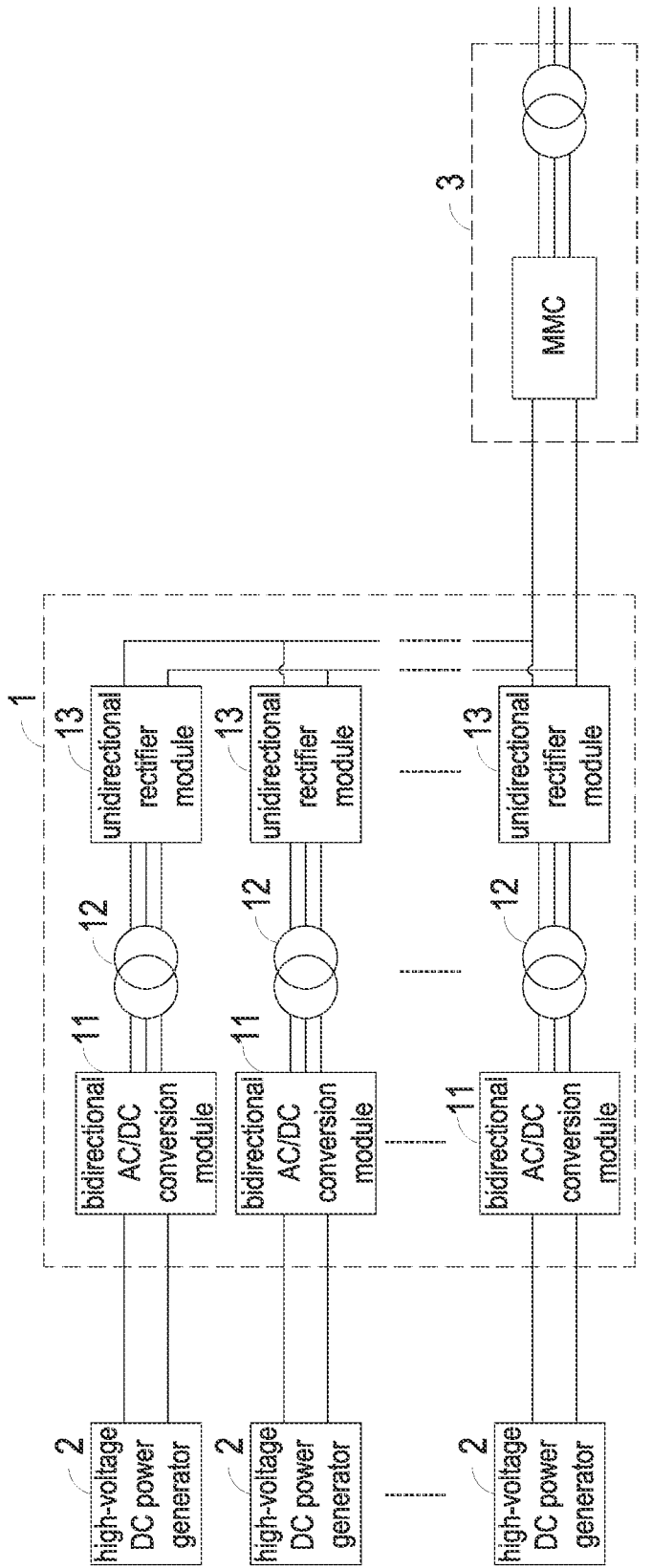
FIG. 3 is a schematic circuit diagram illustrating a high-voltage DC transformation apparatus according to a fourth embodiment of the present disclosure.

FIG. 3 is a schematic circuit diagram illustrating a high-voltage DC transformation apparatus according to a fourth embodiment of the present disclosure. As shown in FIG. 3, in this embodiment, the high-voltage DC transformation apparatus 1 includes a plurality of bidirectional AC/DC conversion modules 11, a plurality of first transformers 12 and a plurality of unidirectional rectifier modules 13. The DC terminal of each bidirectional AC/DC conversion module 11 is electrically connected to the corresponding high-voltage DC power generator 2. The AC terminal of the each bidirectional AC/DC conversion module 11 is electrically connected to the first transmission terminal of the corresponding first transformer 12. The second transmission terminal of each first transformer 12 is electrically connected to the input terminal of the corresponding unidirectional rectifier module 13. The output terminals of the plurality of unidirectional rectifier module 13 are connected to the high-voltage grid 3 in parallel. In this embodiment, there are plural units, and each unit is formed by one bidirectional AC/DC conversion module 11, one first transformer 12 and one unidirectional rectifier module 13 corresponding to each other. Since the plural units are independent from each other, each unit can be linked to or ejected from the high-voltage DC transformation apparatus 1 independently.

Figure 4:
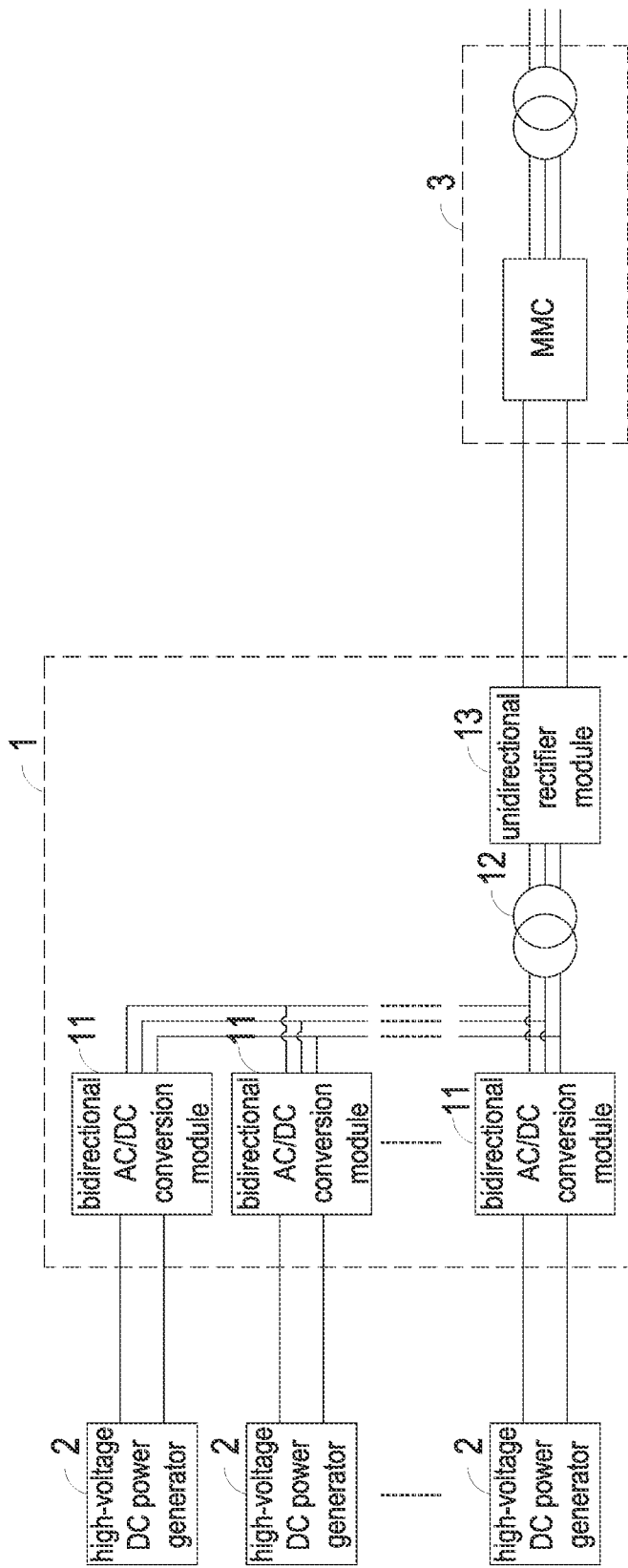
FIGS. 4, 5 and 6 are schematic circuit diagrams illustrating various implementations of the bidirectional AC/DC conversion module and the first transformer of the present disclosure.
Figure 5:
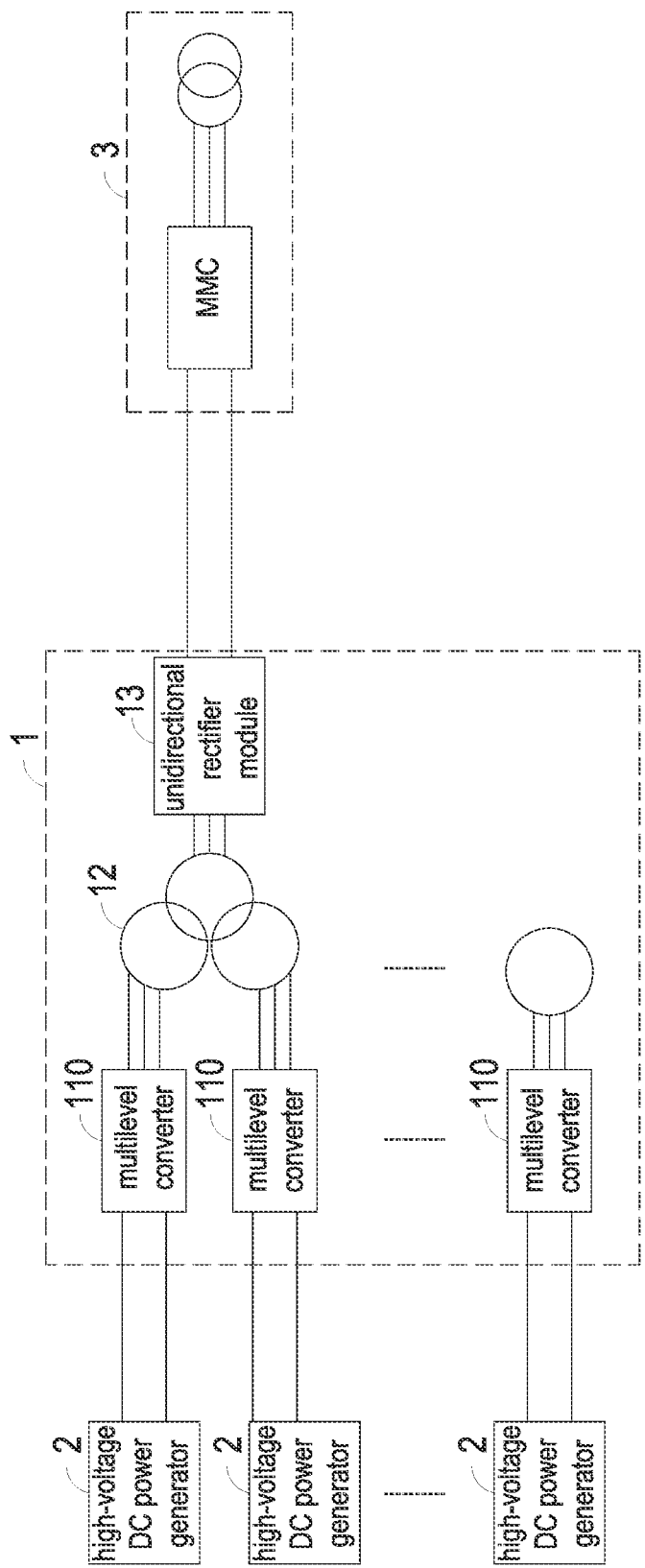

In an embodiment, as shown in FIG. 4, the AC terminals of the plurality of bidirectional AC/DC conversion modules 11 are electrically connected together in parallel and then electrically connected to the first transmission terminal of the first transformer 12. In another embodiment, as shown in FIG. 5, the first transmission terminal of the first transformer 12 includes a plurality of windings, and each winding is electrically connected to the AC terminal of the corresponding bidirectional AC/DC conversion module. Further, the bidirectional AC/DC conversion module 11 shown in FIG. 4 and FIG. 5 may include a multilevel converter, such as a modular multilevel converter (MMC). As shown in FIG. 5, the bidirectional AC/DC conversion module 11 includes a multilevel converter 110 and a first controller. The first controller is electrically connected to the multilevel converter 110 for controlling the switching operation of the multilevel converter 110. Moreover, the first controller controls the voltage on the DC terminal of the bidirectional AC/DC conversion module 11 to be equal to the rated voltage of the high-voltage DC power generator 2.

In addition, the bidirectional AC/DC conversion module 11 shown in FIGS. 1A to 3 may include a multilevel converter (e.g., modular multilevel converter (MMC)) or a plurality of converters.

Figure 6:
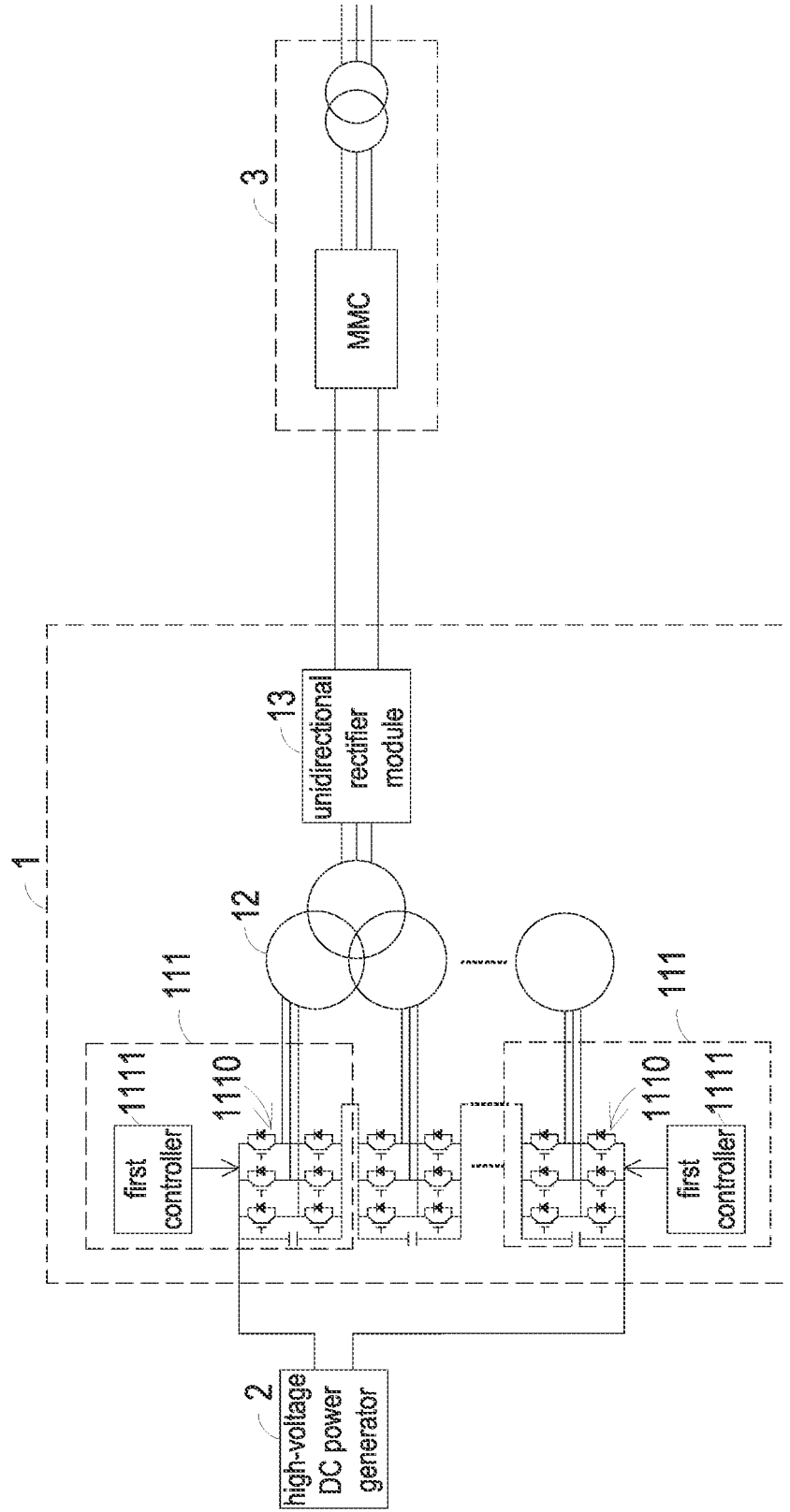

Under the circumstance that the bidirectional AC/DC conversion module 11 includes a plurality of converters, as shown in FIG. 6, the first transmission terminal of the first transformer 12 of the high-voltage DC transformation apparatus 1 in this embodiment includes a plurality of windings. The bidirectional AC/DC conversion module 11 includes a plurality of bidirectional AC/DC converters 111 connected in series. Each winding of the first transmission terminal of the first transformer 12 is electrically connected to the corresponding AC/DC converter 111. The serially connected AC/DC converters 111 form the plurality of converters.

Further, as shown in FIG. 6, the AC/DC converter 111 includes a switch circuit 1110 and a first controller 1111. The first controller 111 controls the switching operation of the switch circuit 1110 so as to adjust the voltage on the DC side of the AC/DC converter 111.

Figure 7:
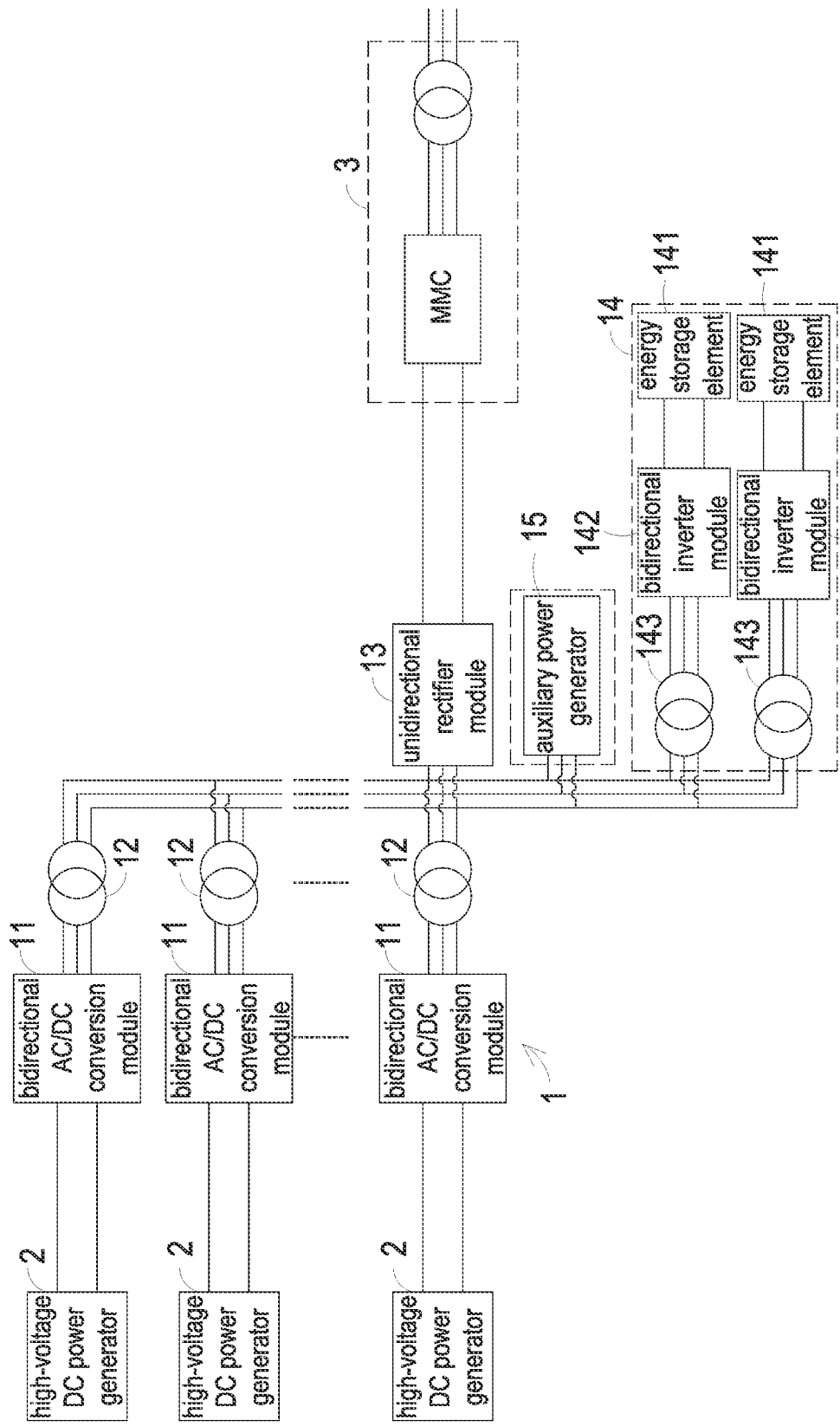
FIG. 7 is a schematic circuit diagram illustrating a high-voltage DC transformation apparatus according to a fifth embodiment of the present disclosure.

FIG. 7 is a schematic circuit diagram illustrating a high-voltage DC transformation apparatus according to a fifth embodiment of the present disclosure. As shown in FIG. 7, in this embodiment, the high-voltage DC transformation apparatus 1 further includes at least one energy storage device 14 or/and an auxiliary power generator 15. The energy storage device 14 and the auxiliary power generator 15 are both electrically connected to the input terminal of the unidirectional rectifier module 13. When the high-voltage DC power generator 2 generates power, the high-voltage DC transformation apparatus 1 enters a grid-connected mode. On the contrary, when the high-voltage DC power generator 2 stops generating power, the high-voltage DC transformation apparatus 1 enters an off-grid mode, and the energy storage device 14 or/and the auxiliary power generator 15 provides an auxiliary power for the high-voltage DC power generator 2. The auxiliary power generator 15 may be a diesel generator. The energy storage device 14 includes at least one energy storage element 141, at least one bidirectional inverter module 142 and at least one second transformer 143. The energy storage element 141 is for example but not limited to an energy storage battery or a capacitor. The bidirectional inverter module 142 has a DC terminal and an AC terminal. The second transformer 143 has a first transmission terminal and a second transmission terminal. The DC terminal of the bidirectional inverter module 142 is electrically connected to the corresponding energy storage element 141. The first transmission terminal of the second transformer 143 is electrically connected to the AC terminal of the corresponding bidirectional inverter module 142. The second transmission terminal of the second transformer 143 is electrically connected to the input terminal of the unidirectional rectifier module 13. The bidirectional inverter module 142 includes an inverter and a third controller. The third controller is electrically connected to the inverter for controlling the switching operation of the inverter. Accordingly, the conversion power of the bidirectional inverter module 142 can be adjusted when the high-voltage DC transformation apparatus 1 enters the grid-connected mode, and the voltage on the AC terminal of the bidirectional inverter module 142 can be adjusted when the high-voltage DC transformation apparatus 1 enters the off-grid mode. Therefore, the power provided for the power grid can be flexibly adjusted by the energy storage device 14 and/or the auxiliary power generator 15, thereby achieving the functions of peak shaving and valley filling, smoothing the new energy source, and fixing the output power. Moreover, when the high-voltage DC transformation apparatus 1 enters the off-grid mode, the energy storage device 14 and/or auxiliary power generator 15 can provide the auxiliary power for the high-voltage DC power generator 2 or even supply power to the DC high-voltage grid 3. Taking the offshore wind power application as an example, when there is no wind in the environment, the power generator (i.e., wind turbine) is in a standby mode, but some systems in the wind turbine need to be ready to start at any time according to the wind speed. Under this circumstance, the energy storage device 14 can provide the auxiliary power for the wind turbine so that the wind turbine can be started at any time according to the wind speed.

In an embodiment, the operating frequency of the second transformer 143 is the same as the operating frequency of the first transformer 12.

As shown in FIG. 7, the energy storage device 14 includes a plurality of energy storage elements 141, a plurality of bidirectional inverter modules 142, and a plurality of second transformers 143. Each energy storage element 141 forms an energy storage unit with the corresponding bidirectional inverter module 142 and the corresponding second transformer 143. A plurality of energy storage units are electrically connected to the input terminal of the unidirectional rectifier module 13 in parallel. Further, the energy storage device 14 and the auxiliary power generator 15 are electrically connected to the input terminal of the unidirectional rectifier module 13 in parallel. In this embodiment, since the energy storage units are independent from each other, each energy storage unit can be linked to or ejected from the energy storage device 14 independently. Due to the plurality of energy storage units of the energy storage device 14, the energy storage capacity and the power supply capacity of the energy storage device 14 are improved. In an embodiment, the main controller determines the power commands for the energy storage units according to the state-of-charge (SOC) of the energy storage elements 141 in different energy storage units respectively.

In an embodiment, the energy storage device 14 includes a plurality of energy storage elements 141 and a plurality of bidirectional inverter modules 142. The DC terminal of each bidirectional inverter module 142 is electrically connected to the corresponding energy storage element 141. The AC terminals of the plurality of bidirectional inverter modules 142 are electrically connected together in parallel and then electrically connected to the first transmission terminal of the second transformer 143. In another embodiment, the energy storage device 14 includes a plurality of energy storage elements 141 and a plurality of bidirectional inverter modules 142. The DC terminal of each bidirectional inverter module 142 is electrically connected to the corresponding energy storage element 141. The first transmission terminal of the second transformer 143 includes a plurality of windings, and each winding is electrically connected to the AC terminal of the corresponding bidirectional inverter module 142.

By disposing the energy storage device 14, the power distribution in the power system can be flexibly adjusted through controlling the energy storage device 14. For example, according to the dispatch command from the high-voltage DC grid, the main controller calculates the power demand for the energy storage device 14 so as to control the charging and discharging operations of the energy storage device 14. Consequently, the peak-shaving and valley-filling function and the functions of fixing the output power and smoothing the new energy source can be achieved.

In an embodiment, the main controller detects the generated power of the high-voltage DC power generator 2, and filters and smoothes the generated power to obtain a target power. After the generated power is subtracted from the target power, a difference value is obtained. According to the difference value, the main controller adjusts the power command of each energy storage element 141 of the energy storage device 14 for controlling the charging and discharging operations of the energy storage element 141 and smoothing the power fluctuations. Consequently, the actual power of the DC grid is consistent with the target power.

In some embodiments, the main controller can dispatch the electric energy according to the load demand of the high-voltage grid 3 and the power generation condition of the high-voltage DC power generator 2. Consequently, the energy storage device 14 can be controlled to achieve the energy time shift function. For example, when the electric energy provided by the high-voltage DC power generator 2 is large and the load demand of the high-voltage grid 3 is small, the surplus electric energy can be stored in the energy storage element 141 of the energy storage device 14. Whereas, when the electric energy provided by the high-voltage DC power generator 2 is low and the load demand is large, the energy stored in the energy storage element 141 can be released and supplied to the high-voltage grid 3.

In some embodiments, in case that the high-voltage DC grid requires the fixed output power, the main controller detects the output power of the high-voltage DC power generator 2. After the output power of the high-voltage DC power generator 20 is subtracted from the target power with the fixed power, the power command of the energy storage device 14 is obtained. According to the state-of-charge (SOC) of the energy storage elements 141, the power command of the energy storage device 1 is allocated to all energy storage elements 141. Therefore, the main controller controls the charging and discharging operations of the energy storage device 14, and the function of producing the fixed output power can be achieved.

When the high-voltage DC transformation apparatus 1 is in the off-grid mode, the electric energy stored in the energy storage element 141 can be released and supplied to the high-voltage DC transmission grid 4 so as to provide the auxiliary power for the high-voltage DC power generator 2. Specifically, the DC power from the energy storage element 141 is converted into an AC power with the third AC voltage by the bidirectional inverter module 142. Preferably, the third AC voltage is a three-phase AC voltage. The second transformer 143 boosts the third AC voltage (e.g., 660V or 480V) to the second AC voltage and transmits the second AC voltage to the second transmission terminal of the first transformer 12 (i.e., the input terminal of the unidirectional rectifier module 13). After the first transformer 12 decreases the second AC voltage to the first AC voltage, the first transmission terminal of the first transformer 12 transmits the first AC voltage to the AC terminal of the bidirectional AC/DC conversion module 11. After the first AC voltage is converted into a first DC voltage by the bidirectional AC/DC conversion module 11, the first DC voltage is fed into the high-voltage DC transmission grid 4 for provide the auxiliary electric energy to the high-voltage DC power generator 2. Meanwhile, in the case that the capacity of the energy storage device 14 is sufficiently large, a portion of the electric energy released from the energy storage device 14 is fed into the high-voltage grid 3 for powering the load. In specific, the unidirectional rectifier module 13 converts the second AC voltage from the energy storage device 14 into the second DC voltage, and the second DC voltage is fed into the high-voltage grid 3. The electric energy conversion and transmission of the auxiliary power generator 15 are similar to that of the energy storage device 14, and the detailed descriptions thereof are omitted herein.

In the high-voltage DC transformation apparatus 1 of the present disclosure, the bidirectional AC/DC conversion module 11, the unidirectional rectifier module 13 and the bidirectional inverter module 142 are controlled by the first, second and third controllers. The operations and the control configurations of the first, second and third controllers under various situations are exemplified as follows.

Figure 8A:
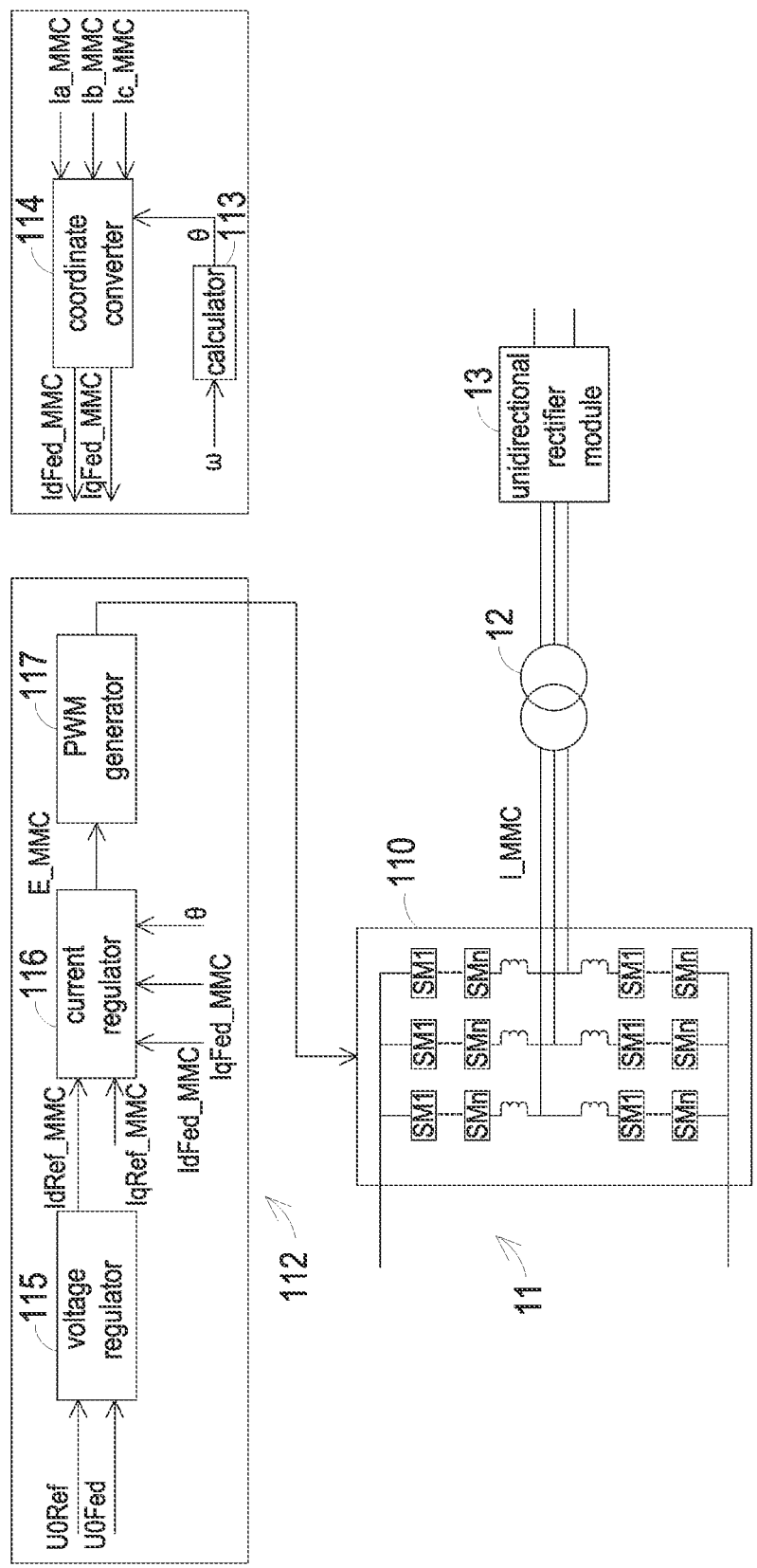
FIGS. 8A, 9A, 10A, 11A, 12A and 13A are schematic diagrams illustrating the control configurations of the first controller, the second controller and the third controller of the present disclosure under various situations.
Figure 8B:
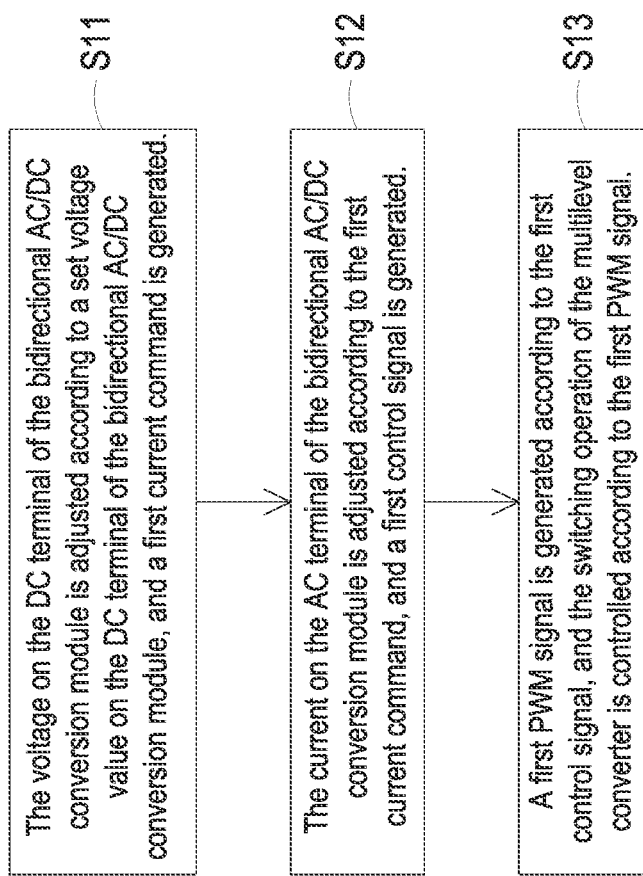
FIGS. 8B, 8C, 9B, 10B, 11B, 12B and 13B are flowcharts illustrating the control steps of the first controller, the second controller and the third controller of the present disclosure under various situations.

Please refer to FIG. 8A and FIG. 8B. In this embodiment, the high-voltage DC transformation apparatus includes a bidirectional AC/DC conversion module 11, a first transformer 12 and a unidirectional rectifier module 13. The bidirectional AC/DC conversion module 11 includes a multilevel converter 110 (e.g., the modular multilevel converter) and a first controller 112. The multilevel converter 110 includes a plurality of bridge arms, and each bridge arm includes a plurality of serially connected switch modules SM. The unidirectional rectifier module 13 include an uncontrolled rectifier. The first controller 112 performs the control method including the followings steps. As shown in FIG. 8B, firstly, in a step S11, the voltage on the DC terminal of the bidirectional AC/DC conversion module 11 is adjusted according to a set voltage value on the DC terminal of the bidirectional AC/DC conversion module 11, and a first current command is generated. Then, in a step S12, the current on the AC terminal of the bidirectional AC/DC conversion module 11 is adjusted according to the first current command, and a first control signal is generated. Finally, in a step S13, a first PWM (pulse width modulation) signal is generated according to the first control signal, and the switching operation of the multilevel converter 110 is controlled according to the first PWM signal.

For implementing the control method of FIG. 8B, as shown in FIG. 8A, the configuration of the first controller 112 includes a calculator 113, a coordinate converter 114, a voltage regulator 115, a current regulator 116 and a PWM generator 117. The calculator 113 generates an angle signal $\theta$ according to the operating angular frequency $\omega$ of the first transformer 12. That is, the calculator 113 integrates the operating angular frequency $\omega$ to generate the angle signal $\theta$. The operating angular frequency $\omega$ of the first transformer 12 can be set by the designer. The coordinate converter 114 generates a d-axis current feedback value IdFed_MMC and a q-axis current feedback value IqFed_MMC on the AC terminal of the bidirectional AC/DC conversion module 11 according to the three-phase current value Iabc_MMC on the AC terminal of the bidirectional AC/DC conversion module 11 and the angle signal $\theta$. The voltage regulator 115 generates a d-axis current command value IdRef_MMC of the bidirectional AC/DC conversion module 11 according to a voltage command value U0Ref and a voltage feedback value U0Fed on the DC terminal of the bidirectional AC/DC conversion module 11. The voltage command value U0Ref on the DC terminal of the bidirectional AC/DC conversion module 11 is a rated DC voltage value of the high-voltage DC power generator 2. The voltage feedback value U0Fed on the DC terminal of the bidirectional AC/DC conversion module 11 is obtained by sampling the voltage U0 on the high-voltage DC transmission grid. The current regulator 116 generates a three-phase control potential E_MMC of the bidirectional AC/DC conversion module 11 according to the d-axis current command value IdRef_MMC, a q-axis current command value IqRef_MMC, the d-axis current feedback value IdFed_MMC, the q-axis current feedback value IqFed_MMC and the angle signal $\theta$. The q-axis current command value IqRef_MMC is zero. The first current command mentioned in the step S12 includes the d-axis current command value IdRef_MMC, and the three-phase control potential E_MMC is the first control signal mentioned in the step S12. The PWM generator 117 generates the first PWM signal according to the three-phase control potential E_MMC, so as to control the switching operation of the multilevel converter 110. For example but not exclusively, the PWM generator 117 generates the first PWM signal through a sinusoidal PWM (SPWM) technology or a space vector PWM (SVPWM) technology. The voltage on the AC terminal of the bidirectional AC/DC conversion module 11 is clamped by the uncontrolled rectifier and the high-voltage grid 3.

Figure 8C:
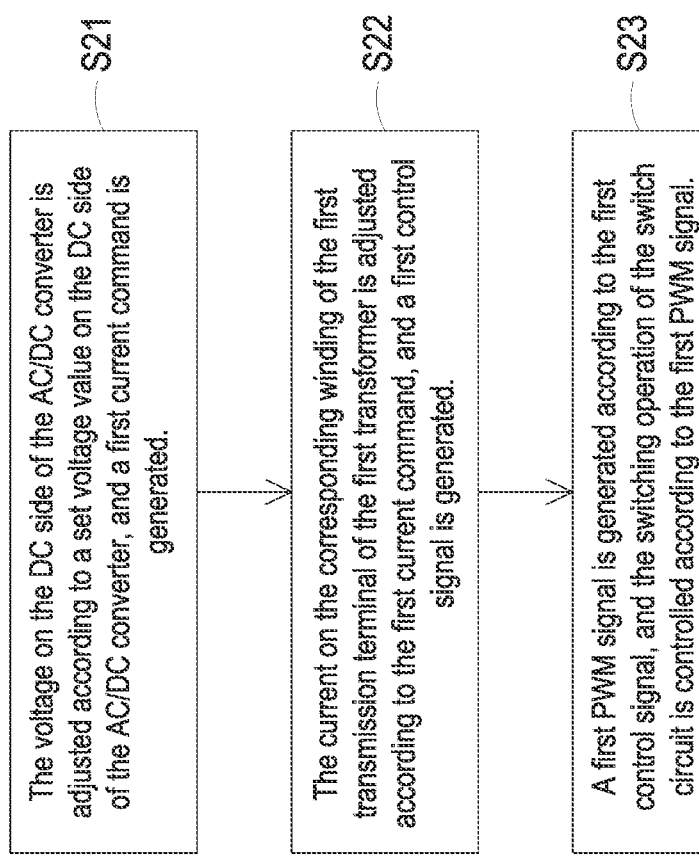

In an embodiment, as shown in FIG. 6, the bidirectional AC/DC conversion module 11 includes a plurality of AC/DC converters 111. The AC/DC converter 111 includes a switch circuit 1110 and a first controller 1111. The first transmission terminal of the first transformer 12 includes a plurality of windings, and each AC/DC converter 111 is electrically connected to the corresponding winding. Correspondingly, the first controller 1111 performs the following steps to control the switching operation of the switch circuit 1110. As shown in FIG. 8C, firstly, in a step S21, the voltage on the DC side of the AC/DC converter 111 is adjusted according to a set voltage value on the DC side of the AC/DC converter 111, and a first current command is generated. Then, in a step S22, the current on the corresponding winding of the first transmission terminal of the first transformer 12 is adjusted according to the first current command, and a first control signal is generated. Finally, in a step S23, a first PWM signal is generated according to the first control signal, and the switching operation of the switch circuit 1110 is controlled according to the first PWM signal. The configuration of the first controller 1111 is similar to that of the first controller 112 shown in FIG. 8A, and the detailed descriptions thereof are omitted herein. The voltage command value on the DC side of the AC/DC converter 111 is obtained by dividing the rated DC voltage value of the high-voltage DC power generator 2 by the number of the AC/DC converters 111. The voltage feedback value on the DC side of the AC/DC converter 111 is obtained by sampling the DC side voltage of the AC/DC converter 111.

Figure 9A:
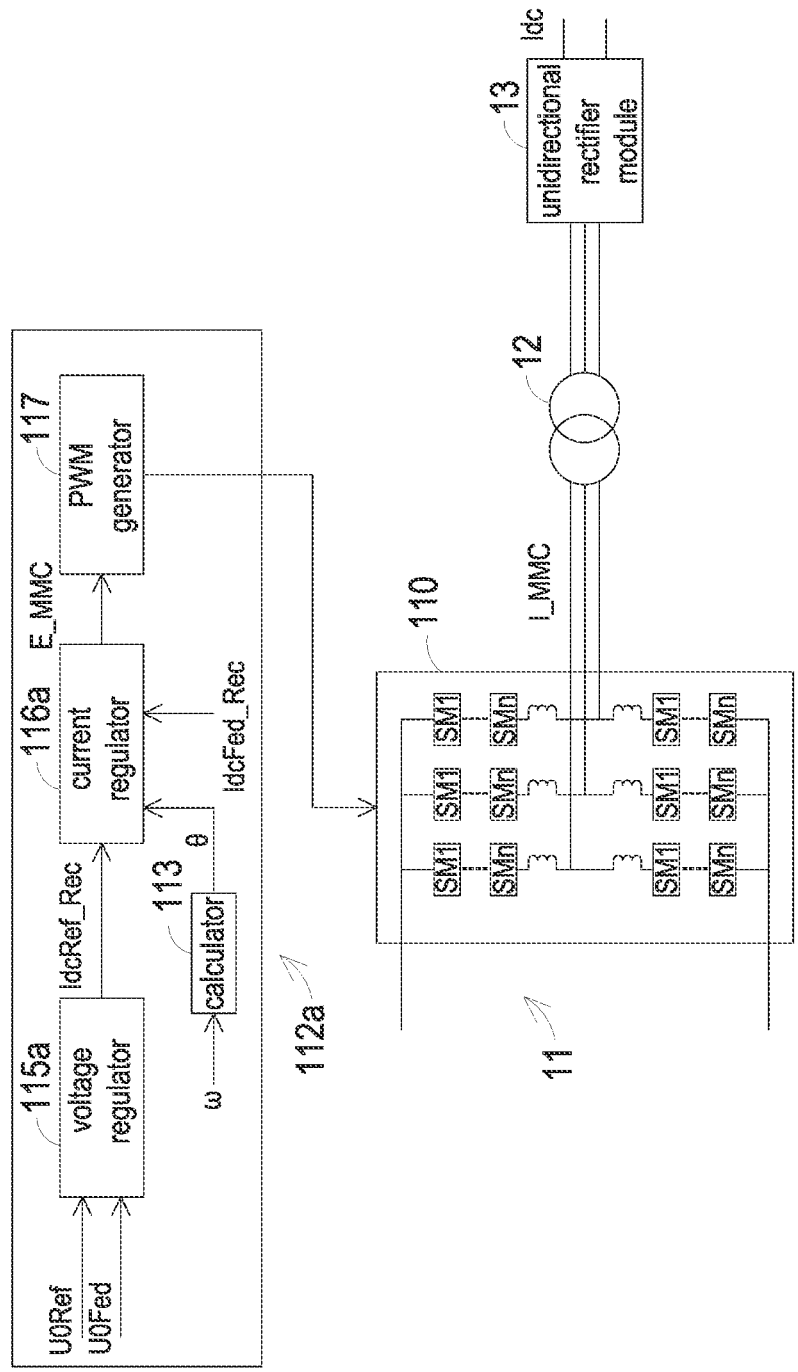
Figure 9B:
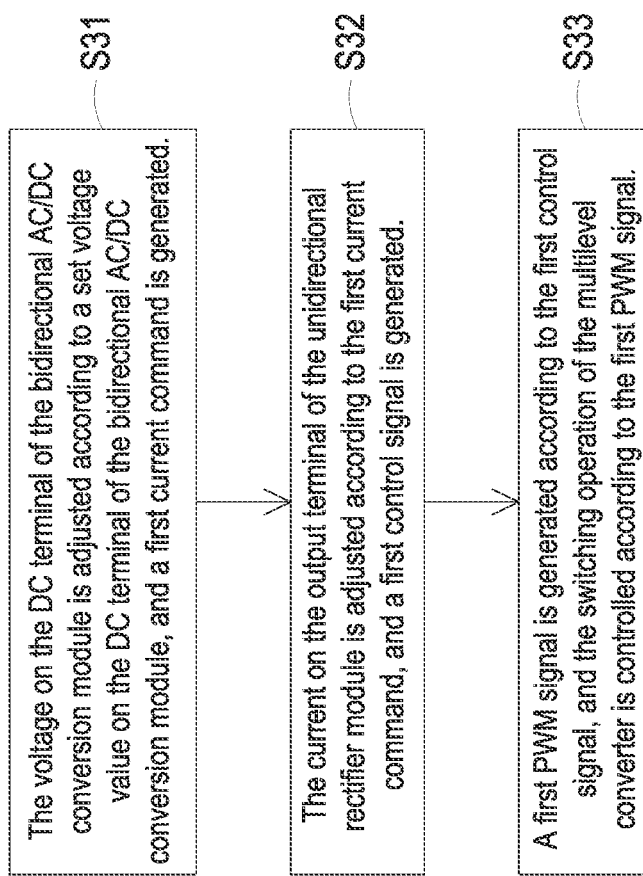

Please refer to FIG. 9A and FIG. 9B. In this embodiment, the high-voltage DC transformation apparatus includes a bidirectional AC/DC conversion module 11, a first transformer 12 and a unidirectional rectifier module 13. The bidirectional AC/DC conversion module 11 includes a multilevel converter 110 and a first controller 112a. The unidirectional rectifier module 13 includes an uncontrolled rectifier. The first controller 112a performs the control method including the followings steps. As shown in FIG. 9B, firstly, in a step S31, the voltage on the DC terminal of the bidirectional AC/DC conversion module 11 is adjusted according to a set voltage value on the DC terminal of the bidirectional AC/DC conversion module 11, and a first current command is generated. Then, in a step S32, the current on the output terminal of the unidirectional rectifier module 13 is adjusted according to the first current command, and a first control signal is generated. Finally, in a step S33, a first PWM signal is generated according to the first control signal, and the switching operation of the multilevel converter 110 is controlled according to the first PWM signal.

For implementing the control method of FIG. 9B, as shown in FIG. 9A, the configuration of the first controller 112a includes a calculator 113, a voltage regulator 115a, a current regulator 116a and a PWM generator 117. The calculator 113 generates an angle signal θ according to the operating angular frequency ω of the first transformer 12. That is, the calculator 113 integrates the operating angular frequency ω to generate the angle signal θ. The voltage regulator 115a generates a DC current command value IdcRef_Rec of the unidirectional rectifier module 13 according to a voltage command value U0Ref and a voltage feedback value U0Fed on the DC terminal of the bidirectional AC/DC conversion module 11. The voltage command value U0Ref on the DC terminal of the bidirectional AC/DC conversion module 11 is a rated value of the output voltage of the high-voltage DC power generator 2. The voltage feedback value U0Fed on the DC terminal of the bidirectional AC/DC conversion module 11 is obtained by sampling the voltage U0 on the high-voltage DC transmission grid. The current regulator 116a generates a three-phase control potential E_MMC of the bidirectional AC/DC conversion module 11 according to the DC current command value IdcRef_Rec, the DC current feedback value IdcFed_Rec and the angle signal θ. The DC current feedback value IdcFed_Rec is obtained by sampling a DC current on the output terminal of the unidirectional rectifier module 13. The PWM generator 117 generates the first PWM signal according to the three-phase control potential E_MMC, so as to control the switching operation of the multilevel converter 110. The voltage on the AC terminal of the bidirectional AC/DC conversion module 11 is clamped by the uncontrolled rectifier and the high-voltage grid 3.

Figure 10A:
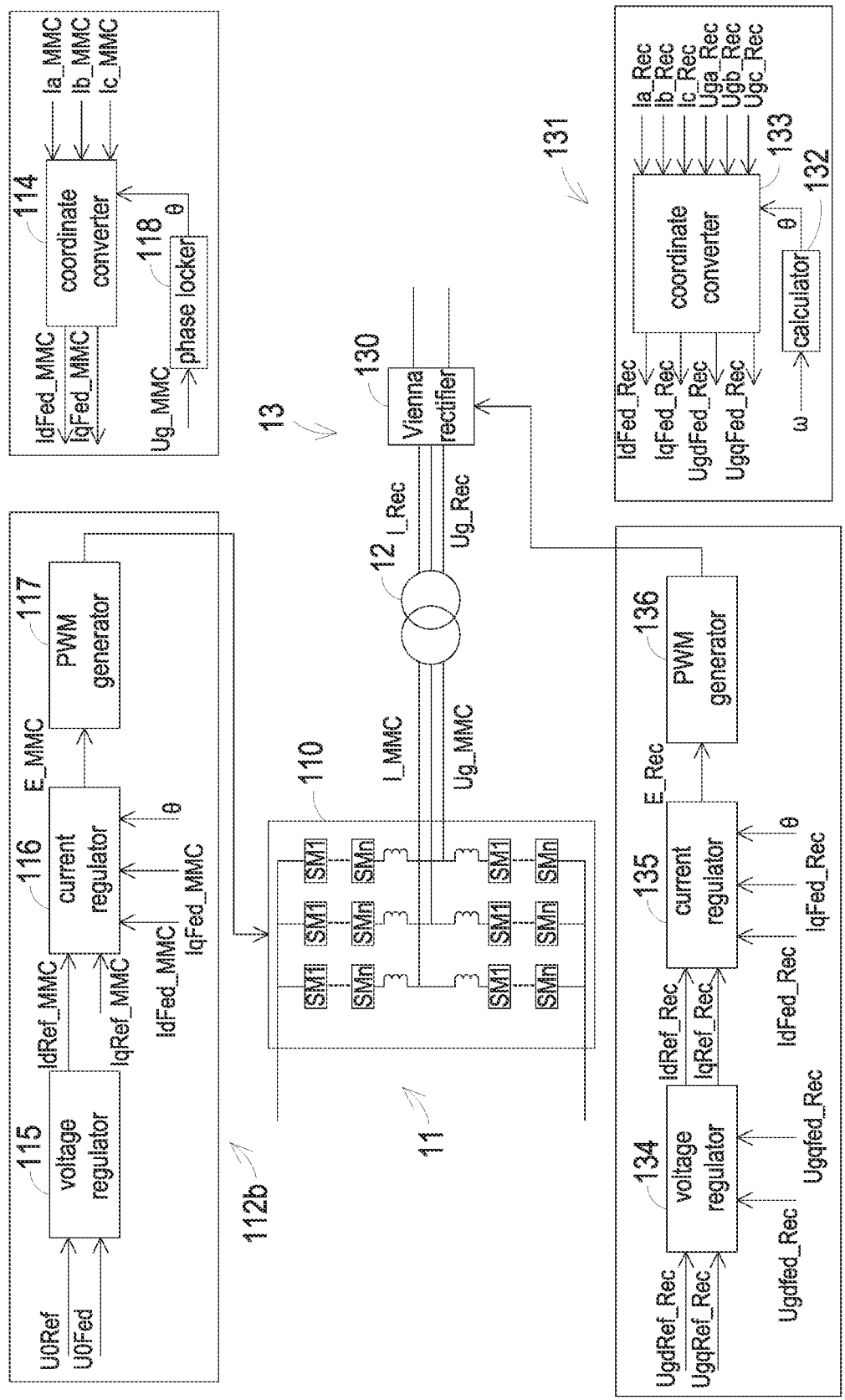
Figure 10B:
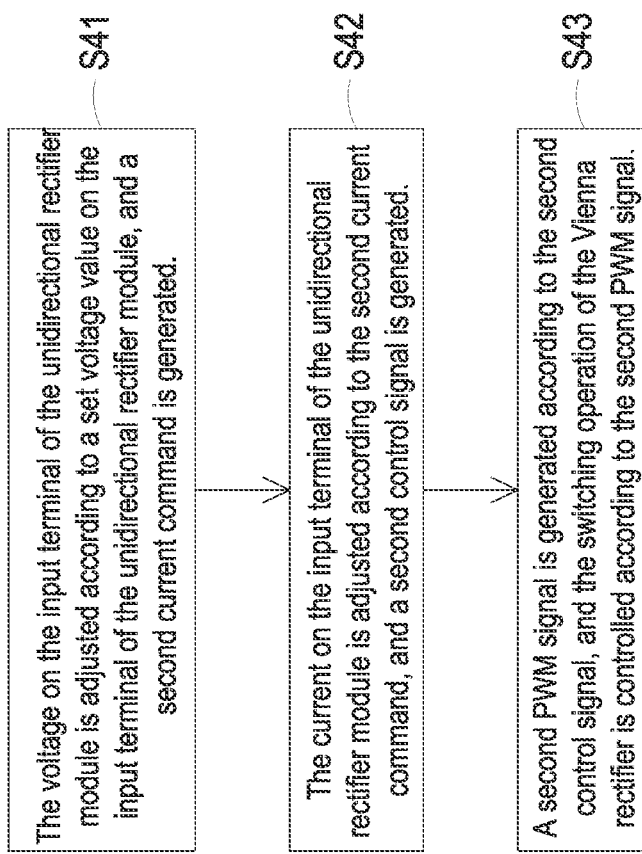

Please refer to FIG. 10A and FIG. 10B. In this embodiment, the high-voltage DC transformation apparatus includes a bidirectional AC/DC conversion module 11, a first transformer 12 and a unidirectional rectifier module 13. The bidirectional AC/DC conversion module 11 includes a multilevel converter 110 and a first controller 112b. The unidirectional rectifier module 13 includes a Vienna rectifier 130 and a second controller 131. The first controller 112b performs the steps of the control method shown in FIG. 8B. The second controller 131 performs the control method including the following steps. As shown in FIG. 10B, firstly, in a step S41, the voltage on the input terminal of the unidirectional rectifier module 13 is adjusted according to a set voltage value on the input terminal of the unidirectional rectifier module 13, and a second current command is generated. Then, in a step S42, the current on the input terminal of the unidirectional rectifier module 13 is adjusted according to the second current command, and a second control signal is generated. Finally, in a step S43, a second PWM signal is generated according to the second control signal, and the switching operation of the Vienna rectifier 130 is controlled according to the second PWM signal.

The first controller 112b of FIG. 10A and the first controller 112 of FIG. 8A have similar configuration for performing the same steps of FIG. 8B. While in comparison with the first controller 112 of FIG. 8A, the configuration of the first controller 112b of FIG. 10A includes a phase locker 118. The phase locker 118 generates the angle signal θ according to the voltage Ug_MMC on the AC terminal of the bidirectional AC/DC conversion module 11. That is, the phase locker 118 locks the phase of the voltage Ug_MMC on the AC terminal of the bidirectional AC/DC conversion module 11 for generating the angle signal θ.

For implementing the control method of FIG. 10B, as shown in FIG. 10A, the configuration of the second controller 131 includes a calculator 132, a coordinate converter 133, a voltage regulator 134, a current regulator 135 and a PWM generator 136. The calculator 132 generates an angle signal θ according to the operating angular frequency ω of the first transformer 12. That is, the calculator 132 integrates the operating angular frequency ω to generate the angle signal θ. The operating angular frequency ω of the first transformer 12 can be set by the designer. The coordinate converter 133 generates a d-axis current feedback value IdFed_Rec, a q-axis current feedback value IqFed_Rec, a d-axis voltage feedback value UgdFed_Rec, and a q-axis voltage feedback value UgdFed_Rec on the input terminal of the unidirectional rectifier module 13 according to the three-phase current value Iabc_Rec and the three-phase voltage value Ugabc_Rec on the input terminal of the unidirectional rectifier module 13 and the angle signal θ. The voltage regulator 134 generates a d-axis current command value IdRef_Rec and a q-axis current command value IqRef_Rec on the input terminal of the unidirectional rectifier module 13 according to the d-axis voltage feedback value UgdFed_Rec, the q-axis voltage feedback value UgdFed_Rec, a d-axis voltage command value UgdRef_Rec, and a q-axis voltage command value UNRef_Rec on the input terminal of the unidirectional rectifier module 13. The set voltage value mentioned in the step S41 includes the d-axis voltage command value UgdRef_Rec and the q-axis voltage command value UgqRef_Rec. The d-axis voltage command value UgdRef_Rec is the rated voltage amplitude on the second transmission terminal of the first transformer 12, and the q-axis voltage command value UgqRef_Rec is zero. The current regulator 135 generates a three-phase control potential E_Rec of the unidirectional rectifier module 13 according to the d-axis current command value IdRef_Rec, the q-axis current command value IqRef_Rec, the d-axis current feedback value IdFed_Rec, the q-axis current feedback value IqFed_Rec and the angle signal θ. The second current command mentioned in the step S42 includes the d-axis current command value IdRef_Rec and the q-axis current command value IqRef_Rec. The three-phase control potential E_Rec is the second control signal mentioned in the step S42. The PWM generator 136 generates the second PWM signal according to the three-phase control potential E_Rec, so as to control the switching operation of the Vienna rectifier 130.

Figure 11A:
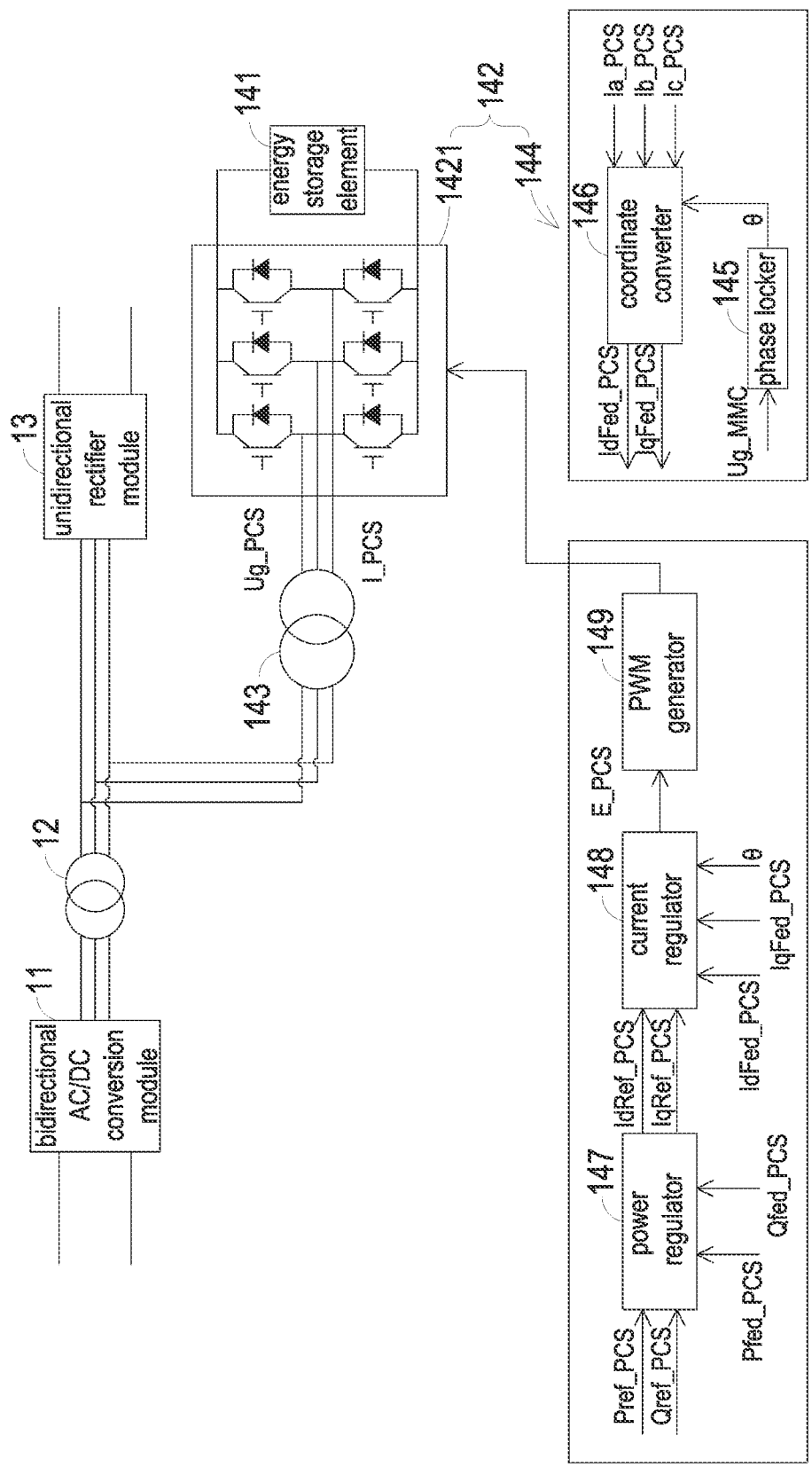
Figure 11B:
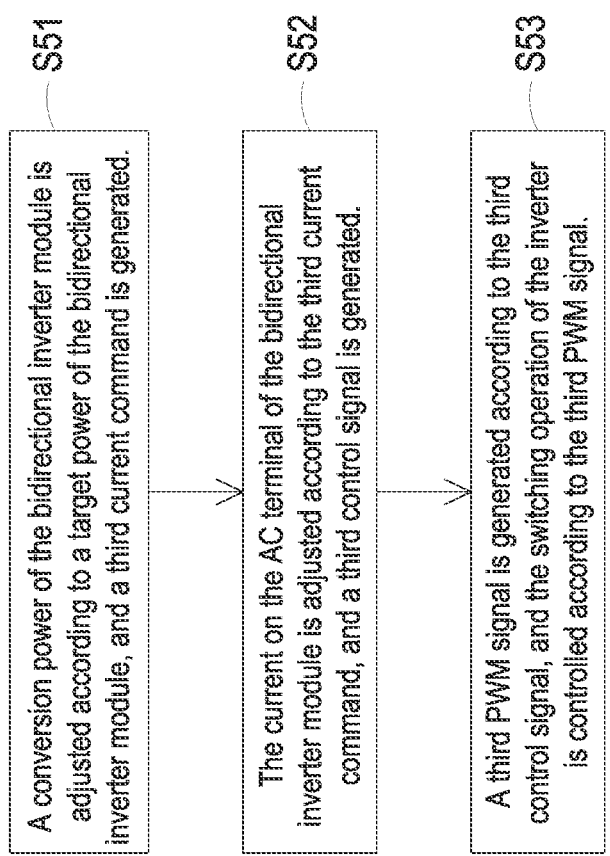

Please refer to FIG. 11A and FIG. 11B. In this embodiment, the high-voltage DC transformation apparatus includes a bidirectional AC/DC conversion module 11, a first transformer 12, a unidirectional rectifier module 13 and an energy storage device 14, and the high-voltage DC transformation apparatus is in a grid-connected mode. The control method and configuration of the first controller of the bidirectional AC/DC conversion module 11 are similar with that of the first controller 112b shown in FIG. 10A and FIG. 10B, and thus the detailed descriptions thereof are omitted herein. The unidirectional rectifier module 13 may include an uncontrolled rectifier or include a Vienna rectifier and a second controller. In the case that the unidirectional rectifier module 13 includes the Vienna rectifier and the second controller, the control method and configuration of the second controller are similar with that of the second controller 131 shown in FIG. 10A and FIG. 10B, and thus the detailed descriptions thereof are omitted herein. The bidirectional inverter module 142 of the energy storage device 14 includes an inverter 1421 and a third controller 144. The third controller 144 performs the control method including the following steps. As shown in FIG. 11B, firstly, in a step S51, a conversion power of the bidirectional inverter module 142 is adjusted according to a target power of the bidirectional inverter module 142, and a third current command is generated. Then, in a step S52, the current on the AC terminal of the bidirectional inverter module 142 is adjusted according to the third current command, and a third control signal is generated. Finally, in a step S53, a third PWM signal is generated according to the third control signal, and the switching operation of the inverter 1421 is controlled according to the third PWM signal.

For implementing the control method of FIG. 11B, as shown in FIG. 11A, the configuration of the third controller 144 includes a phase locker 145, a coordinate converter 146, a power regulator 147, a current regulator 148 and a PWM generator 149. The phase locker 145 generates an angle signal θ according to a voltage Ug_PCS on the first transmission terminal of the second transformer 143. That is, the phase locker 145 locks the phase of the voltage Ug_PCS to generate the angle signal θ. In another embodiment, the phase locker 145 may generate the angle signal θ according to a voltage Ug_PCS on the AC terminal of the bidirectional inverter module 142. The coordinate converter 146 generates a d-axis current feedback value IdFed_PCS and a q-axis current feedback value IqFed_PCS on the AC terminal of the bidirectional inverter module 142 according to the three-phase current value Iabc_PCS on the AC terminal of the bidirectional inverter module 142 and the angle signal θ. The power regulator 147 generates a d-axis current command value IdRef_PCS and a q-axis current command value IqRef_PCS on the AC terminal of the bidirectional inverter module 142 according to an active power command value Pref_PCS, a reactive power command value Qref_PCS, an active power feedback value Pfed_PCS, and a reactive power feedback value Qfed_PCS of the bidirectional inverter module 142. The active power command value Pref_PCS and the reactive power command value Qref_Rec are provided by the main controller. The active power feedback value Pfed_PCS and the reactive power feedback value Qfed_PCS are calculated according to the voltage Ug_PCS and the three-phase current value I_PCS on the AC terminal of the bidirectional inverter module 142. The current regulator 148 generates a three-phase control potential E_PCS of the bidirectional inverter module 142 according to the d-axis current command value IdRef_PCS, the q-axis current command value IqRef_PCS, the d-axis current feedback value IdFed_PCS, the q-axis current feedback value IqFed_PCS and the angle signal θ. The third current command mentioned in the step S52 includes the d-axis current command value IdRef_PCS and the q-axis current command value IqRef_PCS. The three-phase control potential E_PCS is the third control signal mentioned in the step S52. The PWM generator 149 generates the third PWM signal according to the three-phase control potential E_PCS, so as to control the switching operation of the inverter 1421.

In an embodiment, the main controller receives the state-of-charge (SOC) of the plurality of energy storage elements 141 and generates a power command of the bidirectional inverter module 142 according to an upper-level control command and the state-of-charge. Consequently, the conversion power of the bidirectional inverter module 142 can be adjusted according to the practical requirements.

Figure 12A:
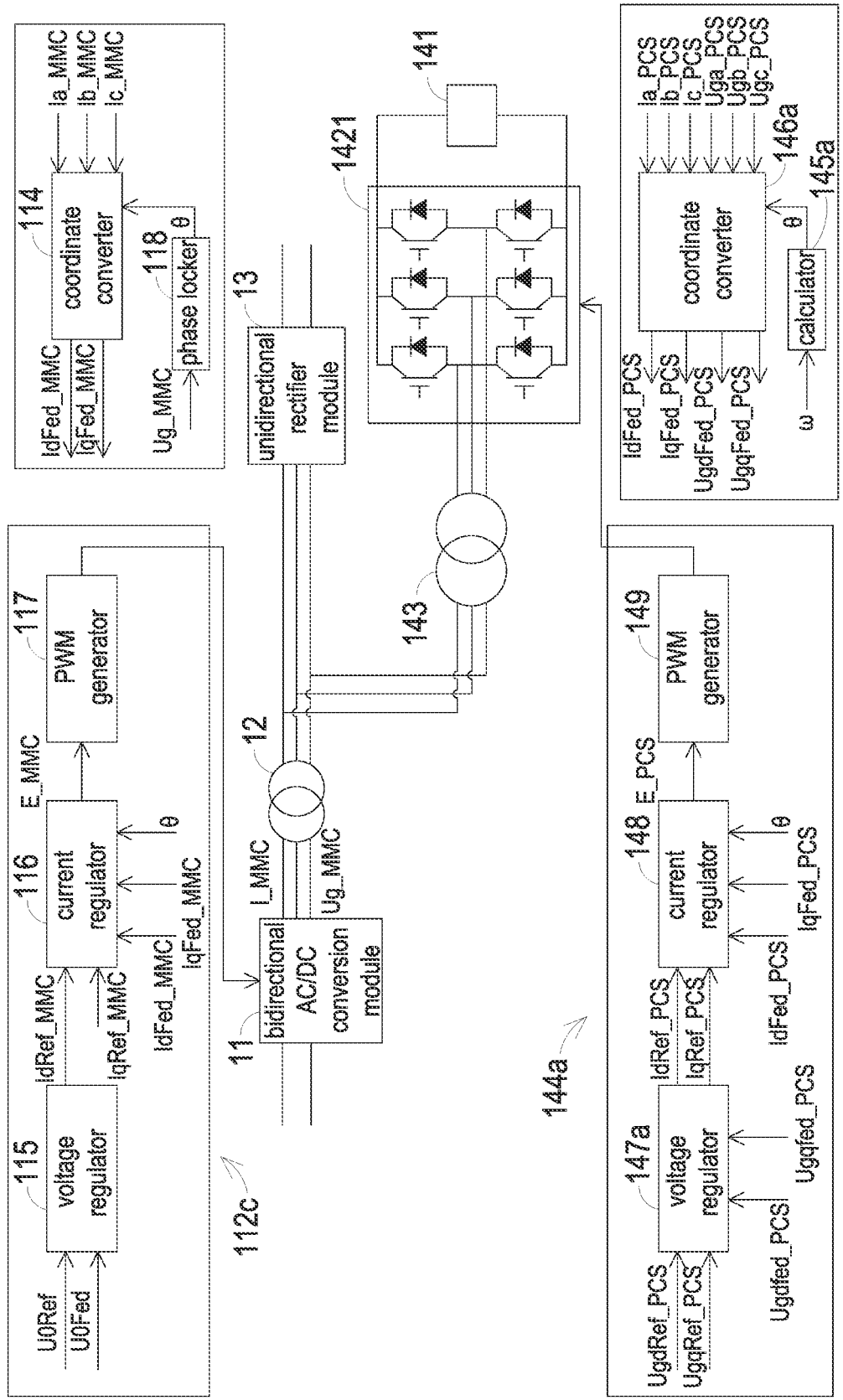
Figure 12B:
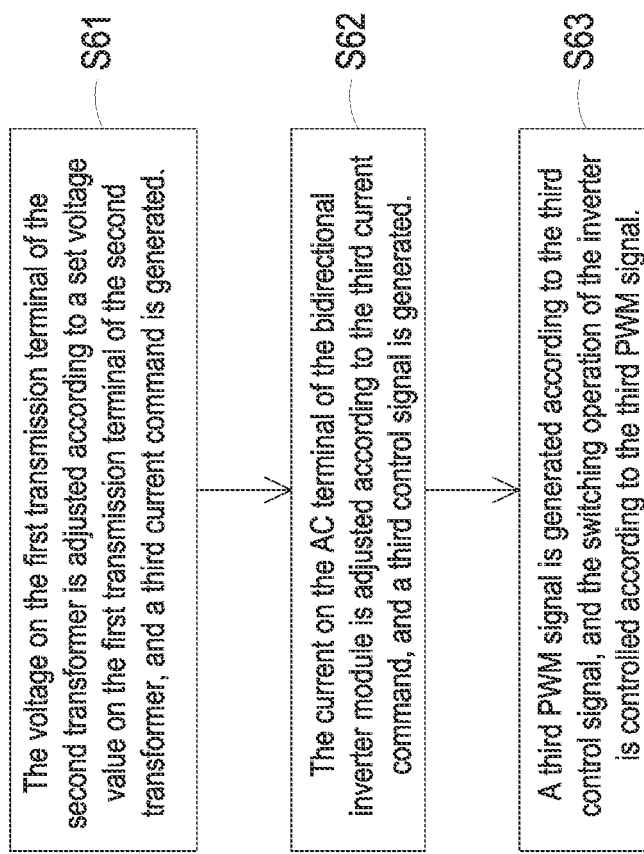

Please refer to FIG. 12A and FIG. 12B. In this embodiment, the high-voltage DC transformation apparatus includes a bidirectional AC/DC conversion module 11, a first transformer 12, a unidirectional rectifier module 13 and an energy storage device 14, and the high-voltage DC transformation apparatus is in an off-grid mode. The control method and configuration of the first controller 112c of the bidirectional AC/DC conversion module 11 are similar with that of the first controller 112b shown in FIG. 10A and FIG. 10B, and thus the detailed descriptions thereof are omitted herein. The unidirectional rectifier module 13 includes an uncontrolled rectifier. The bidirectional inverter module 142 of the energy storage device 14 includes an inverter 1421 and a third controller 144a. The third controller 144a performs the control method including the following steps. As shown in FIG. 12B, firstly, in a step S61, the voltage on the first transmission terminal of the second transformer 143 is adjusted according to a set voltage value on the first transmission terminal of the second transformer 143, and a third current command is generated. Then, in a step S62, the current on the AC terminal of the bidirectional inverter module 142 is adjusted according to the third current command, and a third control signal is generated. Finally, in a step S63, a third PWM signal is generated according to the third control signal, and the switching operation of the inverter 1421 is controlled according to the third PWM signal.

For implementing the control method of FIG. 12B, as shown in FIG. 12A, the configuration of the third controller 144a includes a calculator 145a, a coordinate converter 146a, a voltage regulator 147a, a current regulator 148, and a PWM generator 149. The calculator 145a generates an angle signal θ according to the operating angular frequency ω of the second transformer 143. The operating angular frequency ω of the second transformer 143 can be set by the designer. That is, the calculator 145a integrates the operating angular frequency ω to generate the angle signal θ. According to the three-phase current value Iabc_PCS on the AC terminal of the bidirectional inverter module 142, the three-phase voltage value Ugabc_PCS on the first transmission terminal of the second transformer 143 and the angle signal θ, the coordinate converter 146a generates a d-axis current feedback value IdFed_PCS and a q-axis current feedback value IqFed_PCS on the AC terminal of the bidirectional inverter module 142 and a d-axis voltage feedback value UgdFed_PCS and a q-axis voltage feedback value UgdFed_PCS on the first transmission terminal of the second transformer 143. The voltage regulator 147a generates a d-axis current command value IdRef_PCS and a q-axis current command value IqRef_PCS on the AC terminal of the bidirectional inverter module 142 according to a d-axis voltage command value UgdRef_PCS, a q-axis voltage command value UgqRef_PCS, the d-axis voltage feedback value UgdFed_PCS and the q-axis voltage feedback value UgdFed_PCS on the first transmission terminal of the second transformer 143. The d-axis voltage command value UgdRef_PCS is a rated voltage amplitude on the first transmission terminal of the second transformer 143, and the q-axis voltage command value UgqRef_PCS is zero. The current regulator 148 generates a three-phase control potential E_PCS of the bidirectional inverter module 142 according to the d-axis current command value IdRef_PCS, the q-axis current command value IqRef_PCS, the d-axis current feedback value IdFed_PCS, the q-axis current feedback value IqFed_PCS and the angle signal θ. The PWM generator 149 generates the third PWM signal according to the three-phase control potential E_PCS, so as to control the switching operation of the inverter 1421.

Figure 13A:
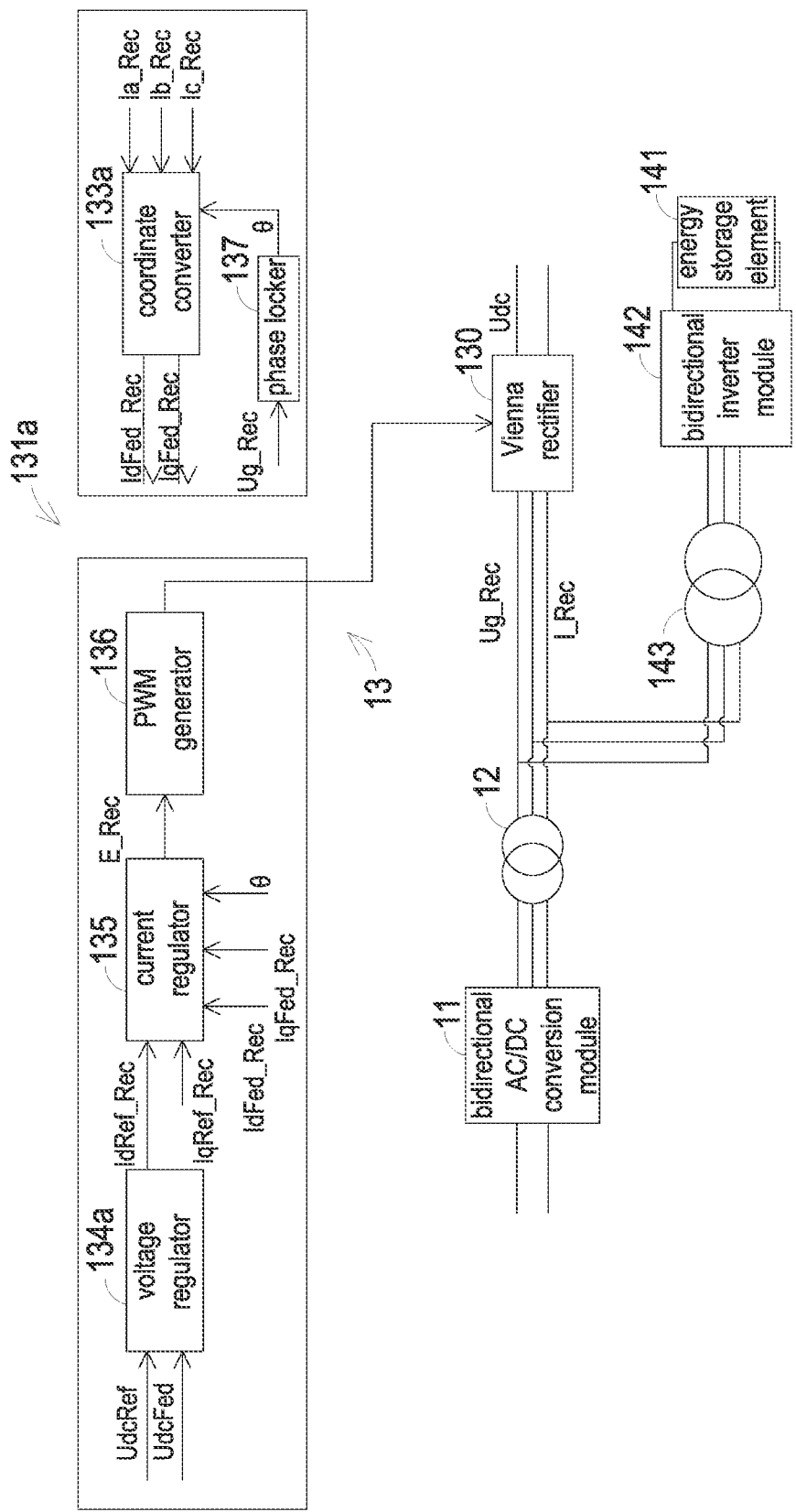
Figure 13B:
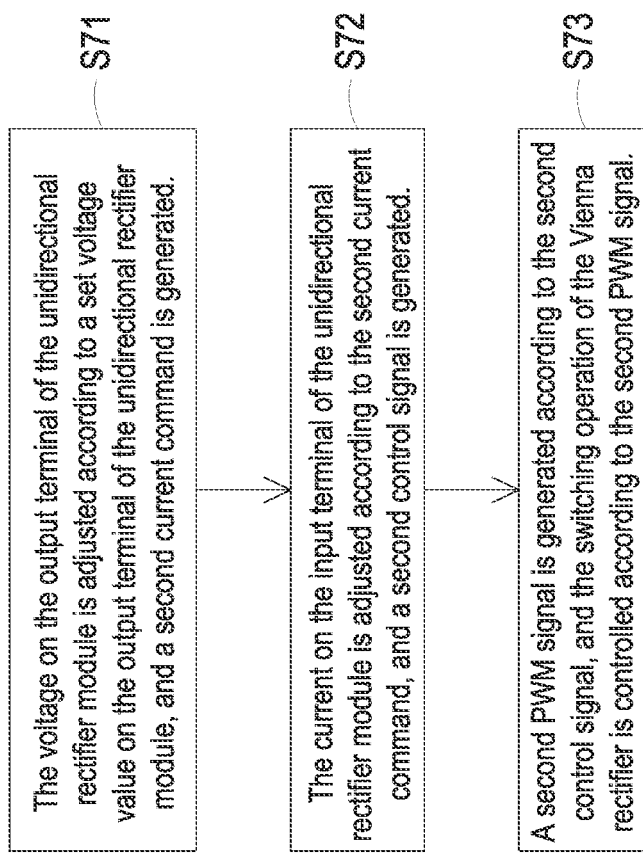

Please refer to FIG. 13A and FIG. 13B. In this embodiment, the high-voltage DC transformation apparatus includes a bidirectional AC/DC conversion module 11, a first transformer 12, a unidirectional rectifier module 13 and an energy storage device 14, and the high-voltage DC transformation apparatus is in an off-grid mode. The control method and configuration of the first controller of the bidirectional AC/DC conversion module 11 and the third controller of the bidirectional inverter module 142 of the energy storage device 14 are similar with that of the first controller 112c and the third controller 144a shown in FIG. 12A and FIG. 12B, and thus the detailed descriptions thereof are omitted herein. The unidirectional rectifier module 13 includes a Vienna rectifier 130 and a second controller 131a. The second controller 131a performs the control method including the following steps. As shown in FIG. 13B, firstly, in a step S71, the voltage on the output terminal of the unidirectional rectifier module 13 is adjusted according to a set voltage value on the output terminal of the unidirectional rectifier module 13, and a second current command is generated. Then, in a step S72, the current on the input terminal of the unidirectional rectifier module 13 is adjusted according to the second current command, and a second control signal is generated. Finally, in a step S73, a second PWM signal is generated according to the second control signal, and the switching operation of the Vienna rectifier 130 is controlled according to the second PWM signal.

For implementing the control method of FIG. 13B, as shown in FIG. 13A, the control configuration of the second controller 131a includes a phase locker 137, a coordinate converter 133a, a voltage regulator 134a, a current regulator 135, and a PWM generator 136. The phase locker 137 generates an angle signal θ according to a voltage Ug_Rec on the input terminal of the unidirectional rectifier module 13. The coordinate converter 133a generates a d-axis current feedback value IdFed_Rec and a q-axis current feedback value IqFed_Rec on the input terminal of the unidirectional rectifier module 13 according to the three-phase current value Iabc_Rec on the input terminal of the unidirectional rectifier module 13 and the angle signal θ. The voltage regulator 134a generates a d-axis current command value IdRef_Rec on the input terminal of the unidirectional rectifier module 13 according to a DC voltage command value UdcRef and a DC voltage feedback value UdcFed on the output terminal of the unidirectional rectifier module 13. A q-axis current command value IqRef_Rec is zero. The DC voltage command value UdcRef on the output terminal of the unidirectional rectifier module 13 is a rated value of the output voltage of the high-voltage DC transformation apparatus 1. The DC voltage feedback value UdcFed is obtained by sampling the voltage Udc on the output terminal of the unidirectional rectifier module 13. The current regulator 135 generates a three-phase control potential E_Rec of the unidirectional rectifier module 13 according to the d-axis current command value IdRef_Rec, the q-axis current command value IqRef_Rec, the d-axis current feedback value IdFed_Rec, the q-axis current feedback value IqFed_Rec and the angle signal θ. The PWM generator 136 generates the second PWM signal according to the three-phase control potential E_Rec, so as to control the switching operation of the Vienna rectifier 130.

Figure 14:
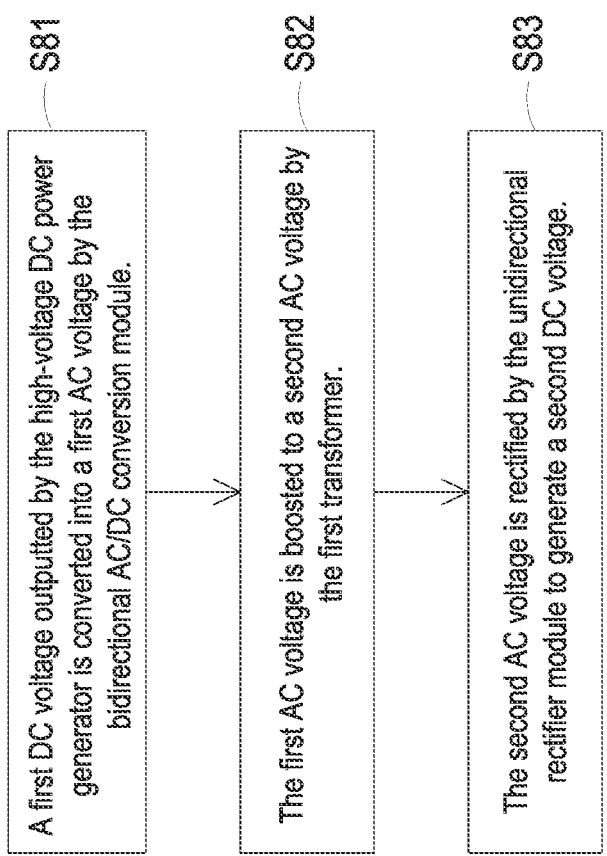
FIG. 14 is a flowchart illustrating a control method of the power system according to an embodiment of the present disclosure.

As shown in FIG. 1, the high-voltage DC transformation apparatus 1 of the present disclosure may form a power system with at least one high-voltage DC power generator 2. A corresponding control method of the power system according to an embodiment of the present disclosure is shown in FIG. 14. The control method of the power system includes the following steps. Firstly, in a step S81, a first DC voltage outputted by the high-voltage DC power generator 2 is converted into a first AC voltage by the bidirectional AC/DC conversion module 11. Then, in a step S82, the first AC voltage is boosted to a second AC voltage by the first transformer 12. Finally, in a step S83, the second AC voltage is rectified by the unidirectional rectifier module 13 to generate a second DC voltage.

Figure 15:
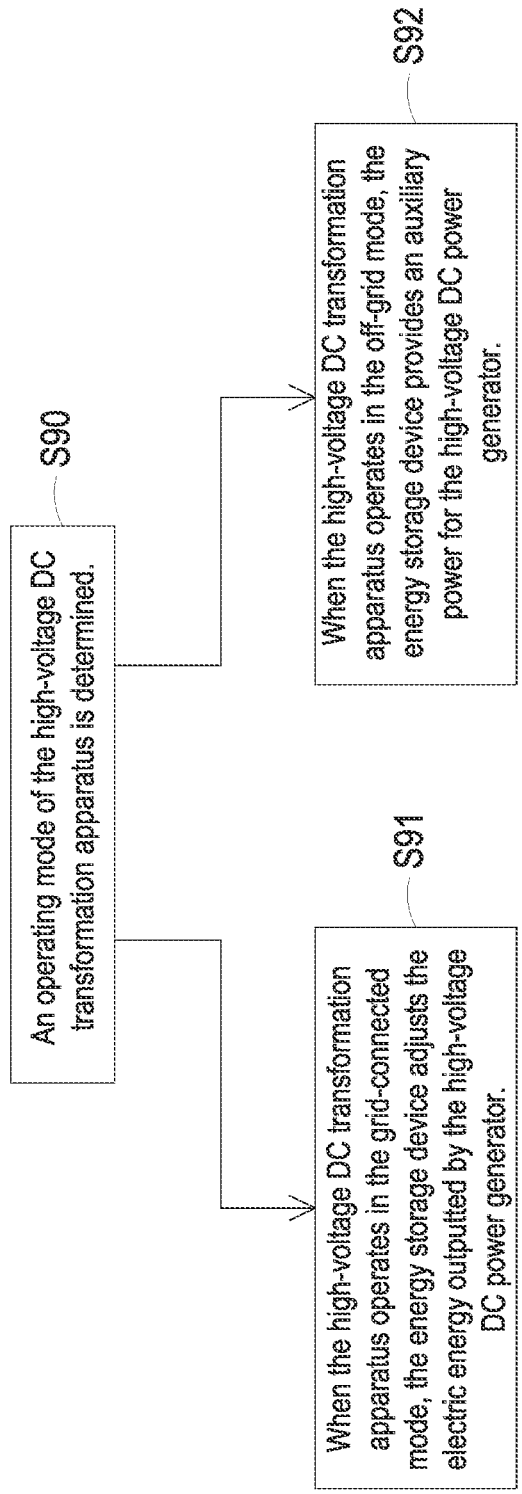
FIG. 15 is a flowchart illustrating a variant of the control method of the power system shown in FIG. 14.

In an embodiment, the high-voltage DC transformation apparatus 1 further includes an energy storage device 14. The control for the energy storage device 14 may be different, which depends on that the high-voltage DC transformation apparatus 1 is in the grid-connected mode or the off-grid mode. As shown in FIG. 15, the control method further includes steps S90, S91 and S92. In the step S90, an operating mode of the high-voltage DC transformation apparatus 1 is determined. In the step S91, when the high-voltage DC transformation apparatus 1 operates in the grid-connected mode, the energy storage device 14 adjusts the electric energy outputted by the high-voltage DC power generator 2. In the step S92, when the high-voltage DC transformation apparatus 1 operates in the off-grid mode, the energy storage device 14 provides an auxiliary power for the high-voltage DC power generator 2.

Figure 16:
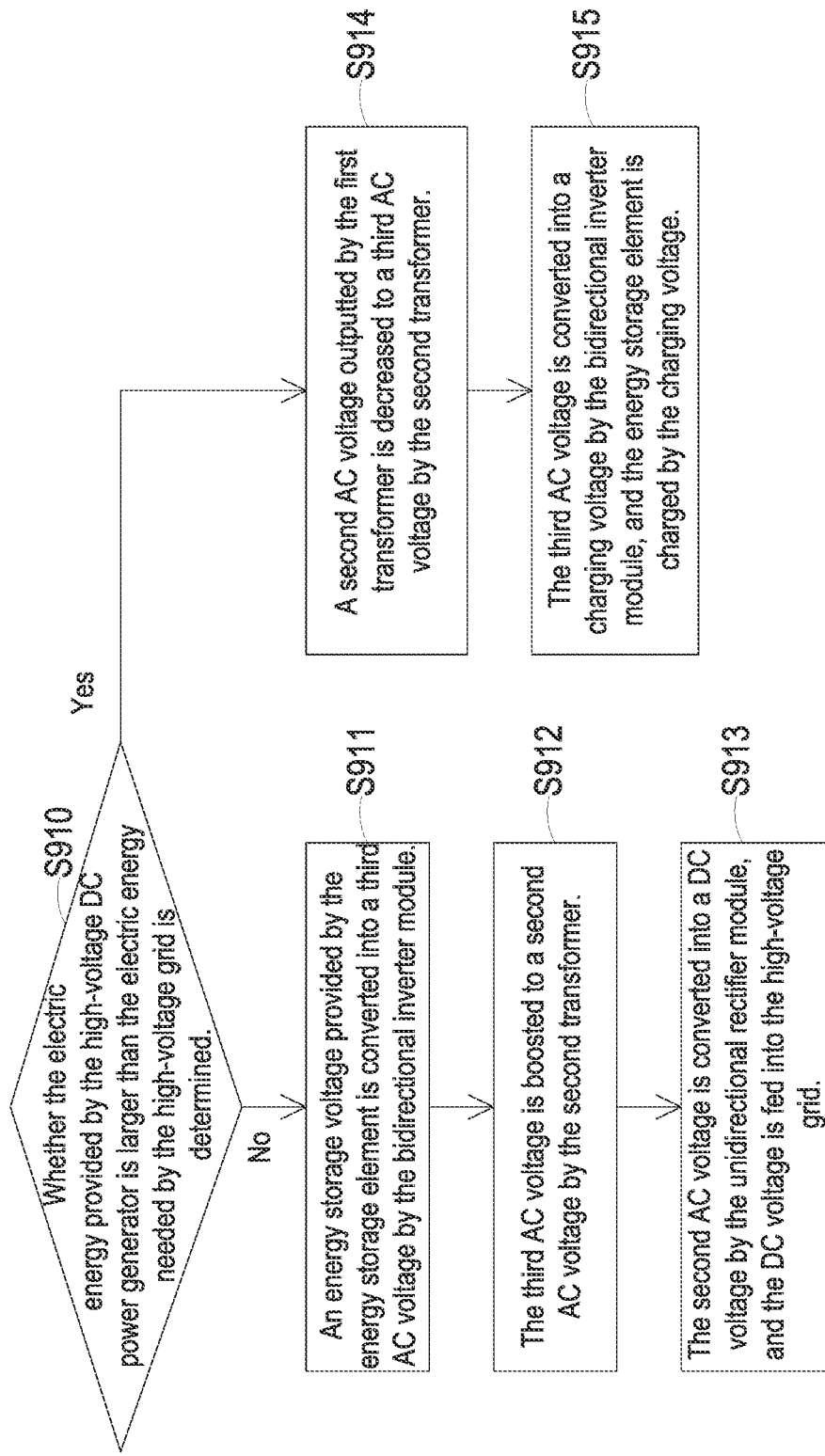
FIG. 16 is a flowchart illustrating the substeps of the step S91 of the control method shown in FIG. 15.

FIG. 16 is a flowchart illustrating the substeps of the step S91 of the control method shown in FIG. 15. As shown in FIG. 16, the step S91 includes the following substeps. Firstly, in a substep S910, whether the electric energy provided by the high-voltage DC power generator 2 is larger than the electric energy needed by the high-voltage grid 3 is determined. If the determining result of the substep S910 is that the electric energy provided by the high-voltage DC power generator 2 is smaller than the electric energy needed by the high-voltage grid 3, substeps S911, S912 and S913 are performed. Firstly, in the substep S911, an energy storage voltage provided by the energy storage element 141 is converted into a third AC voltage by the bidirectional inverter module 142. Afterward, in the substep S912, the third AC voltage is boosted to a second AC voltage by the second transformer 143. Finally, in the substep S913, the second AC voltage is converted into a DC voltage by the unidirectional rectifier module 13, and the DC voltage is fed into the high-voltage grid 3. Alternatively, if the determining result of the substep S910 is that the electric energy provided by the high-voltage DC power generator 2 is larger than the electric energy needed by the high-voltage grid 3, substeps S914 and S915 are performed. Firstly, in the substep S914, a second AC voltage outputted by the first transformer 12 is decreased to a third AC voltage by the second transformer 143. Then, in the substep S915, the third AC voltage is converted into a charging voltage by the bidirectional inverter module 142, and the energy storage element 141 is charged by the charging voltage.

Figure 17:
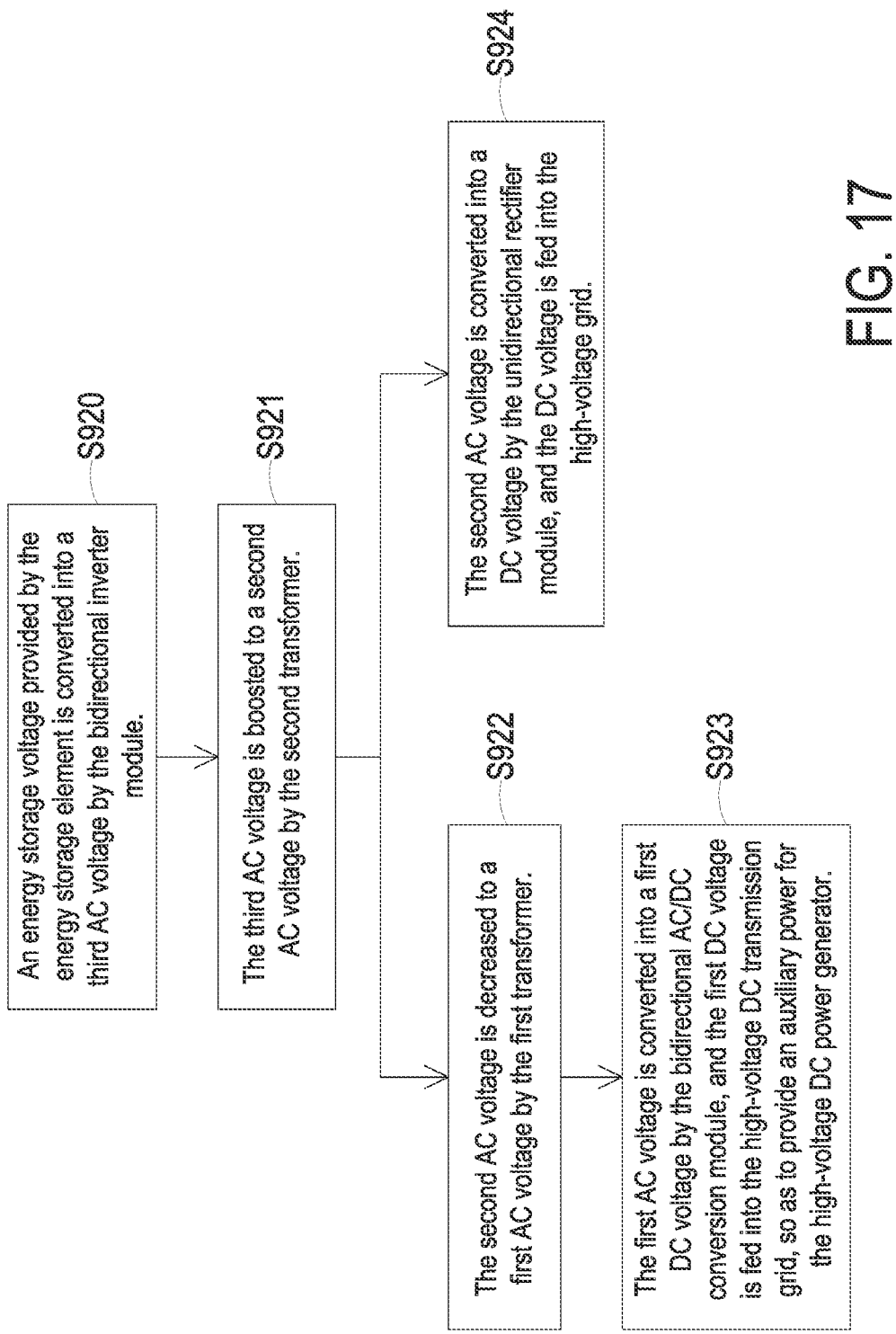
FIG. 17 is a flowchart illustrating the substeps of the step S92 of the control method shown in FIG. 15.

FIG. 17 is a flowchart illustrating the substeps of the step S92 of the control method shown in FIG. 15. As shown in FIG. 17, the step S92 includes the following substeps. Firstly, in a substep S920, an energy storage voltage provided by the energy storage element 141 is converted into a third AC voltage by the bidirectional inverter module 142. Then, in a substep S921, the third AC voltage is boosted to a second AC voltage by the second transformer 143. Afterward, in a substep S922, the second AC voltage is decreased to a first AC voltage by the first transformer 12. Finally, in a substep S923, the first AC voltage is converted into a first DC voltage by the bidirectional AC/DC conversion module 11, and the first DC voltage is fed into the high-voltage DC transmission grid 4, so as to provide an auxiliary power for the high-voltage DC power generator 2. Further, in the case that the capacity of the energy storage device 14 is sufficiently large, a substep S924 is also performed during performing the substeps S922 and S923. In the substep 924, the second AC voltage is converted into a DC voltage by the unidirectional rectifier module 13, and the DC voltage is fed into the high-voltage grid 3.

In summary, the present disclosure provides a high-voltage DC transformation apparatus, a power system employing the high-voltage DC transformation apparatus, and a control method of the power system. The electric power generated by the power generator is boosted (e.g., boosted to 150 KV) so that the long-distance power transmission is performed based on the high-voltage DC power. Consequently, the transmission loss and the cost are reduced. When the frequency of the transformer is greater than 50 Hz, the volume and cost of the transformer can be reduced. Meanwhile, the volume and cost of the energy storage device and the bidirectional AC/DC conversion module, which are electrically connected to the transformer, can be reduced as well. In addition, the power provided for the power grid can be flexibly adjusted by the energy storage device and/or the auxiliary power generator, thereby achieving the functions of peak shaving and valley filling, smoothing the new energy source, and fixing the output power. Moreover, when the high-voltage DC transformation apparatus enters the off-grid mode, the energy storage device and/or the auxiliary power generator can provide the auxiliary power for the high-voltage DC power generator or even supply power to the DC grid.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A high-voltage DC transformation apparatus, electrically connected to at least one high-voltage DC power generator, comprising:
   at least one bidirectional AC/DC conversion module, wherein a DC terminal of the bidirectional AC/DC conversion module is electrically connected to the corresponding high-voltage DC power generator;
   at least one first transformer each of that comprises a first transmission terminal and a second transmission terminal, wherein the first transmission terminal is electrically connected to an AC terminal of the corresponding bidirectional AC/DC conversion module; and
   at least one unidirectional rectifier module each of that comprises an input terminal and an output terminal, wherein the input terminal is electrically connected to the second transmission terminal of the corresponding first transformer, and the output terminal is electrically connected to a high-voltage grid;
   wherein the DC transformation apparatus comprises at least one energy storage device electrically connected to the input terminal of the unidirectional rectifier module, the energy storage device comprises at least one energy storage element, at least one bidirectional inverter module and at least one second transformer, a DC terminal of the bidirectional inverter module is electrically connected to the corresponding energy storage element, a first transmission terminal of the second transformer is electrically connected to an AC terminal of the corresponding bidirectional inverter module, and a second transmission terminal of the second transformer is electrically connected to the input terminal of the unidirectional rectifier module.

2. The high-voltage DC transformation apparatus according to claim 1, wherein an operating frequency of the first transformer is larger than 50 Hz.

3. The high-voltage DC transformation apparatus according to claim 1, wherein the high-voltage DC transformation apparatus comprises a plurality of said bidirectional AC/DC conversion modules and a plurality of said first transformers, the DC terminal of each of the plurality of bidirectional AC/DC conversion modules is electrically connected to the corresponding high-voltage DC power generator, the AC terminal of each of the plurality of bidirectional AC/DC conversion modules is electrically connected to the first transmission terminal of the corresponding first transformer, and the second transmission terminals of the plurality of first transformers are electrically connected together in parallel and then electrically connected to the unidirectional rectifier module.

4. The high-voltage DC transformation apparatus according to claim 1, wherein the high-voltage DC transformation apparatus comprises a plurality of said bidirectional AC/DC conversion modules, the DC terminal of each of the plurality of bidirectional AC/DC conversion modules is electrically connected to the corresponding high-voltage DC power generator, the AC terminals of the plurality of bidirectional AC/DC conversion modules are electrically connected together in parallel and then electrically connected to the first transmission terminal of the first transformer, and the second transmission terminal of the first transformer is electrically connected to the input terminal of the unidirectional rectifier module.

5. The high-voltage DC transformation apparatus according to claim 1, wherein the high-voltage DC transformation apparatus comprises a plurality of said bidirectional AC/DC conversion modules, the DC terminal of each of the plurality of bidirectional AC/DC conversion modules is electrically connected to the corresponding high-voltage DC power generator, the first transmission terminal of the first transformer comprises a plurality of windings, each of the plurality of windings is electrically connected to the AC terminal of the corresponding unidirectional rectifier module, and the second transmission terminal of the first transformer is electrically connected to the input terminal of the unidirectional rectifier module.

6. The high-voltage DC transformation apparatus according to claim 1, wherein the high-voltage DC transformation apparatus is electrically connected to a plurality of said high-voltage DC power generators, wherein the high-voltage DC transformation apparatus comprises a plurality of said bidirectional AC/DC conversion modules, a plurality of said first transformers and a plurality of said unidirectional rectifier modules, the DC terminal of each of the plurality of bidirectional AC/DC conversion modules is electrically connected to the corresponding high-voltage DC power generator, the AC terminal of each of the plurality of bidirectional AC/DC conversion modules is electrically connected to the first transmission terminal of the corresponding first transformer, the second transmission terminal of each of the plurality of first transformers is electrically connected to the input terminal of the corresponding unidirectional rectifier module, and the output terminals of the plurality of unidirectional rectifier modules are electrically connected together in parallel.

7. The high-voltage DC transformation apparatus according to claim 1, wherein the first transmission terminal of the first transformer comprises a plurality of windings, the bidirectional AC/DC conversion module comprises a plurality of bidirectional AC/DC converters connected in series, each of the plurality of windings is electrically connected to the corresponding bidirectional AC/DC converter, and each of the plurality of bidirectional AC/DC converters comprises a switch circuit and a first controller for controlling the switching operation of the switch circuit to adjust a voltage on a DC side of the bidirectional AC/DC converter.

8. The high-voltage DC transformation apparatus according to claim 7, wherein the first controller performs a control method comprising steps of:
(a) adjusting the voltage on the DC side of the bidirectional AC/DC converter according to a set voltage value on the DC side of the bidirectional AC/DC converter, and generating a first current command;
(b) adjusting a current on the corresponding winding of the first transmission terminal of the first transformer according to the first current command, and generating a first control signal; and
(c) generating a first PWM signal according to the first control signal, and controlling the switching operation of the switch circuit according to the first PWM signal.

9. The high-voltage DC transformation apparatus according to claim 1, wherein the bidirectional AC/DC conversion module comprises a multilevel converter and a first controller, and the first controller is electrically connected to the multilevel converter for controlling the switching operation of the multilevel converter, thereby adjusting a voltage on the DC terminal of the bidirectional AC/DC conversion module.

10. The high-voltage DC transformation apparatus according to claim 9, wherein the first controller performs a control method comprising steps of:
(a) adjusting the voltage on the DC terminal of the bidirectional AC/DC conversion module according to a set voltage value on the DC terminal of the bidirectional AC/DC conversion module, and generating a first current command;
(b) adjusting a current on the AC terminal of the bidirectional AC/DC conversion module according to the first current command, and generating a first control signal; and
(c) generating a first PWM signal according to the first control signal, and controlling the switching operation of the multilevel converter according to the first PWM signal.

11. The high-voltage DC transformation apparatus according to claim 9, wherein the first controller performs a control method comprising steps of:
(a) adjusting the voltage on the DC terminal of the bidirectional AC/DC conversion module according to a set voltage value on the DC terminal of the bidirectional AC/DC conversion module, and generating a first current command;
(b) adjusting a current on the output terminal of the unidirectional rectifier module according to the first current command, and generating a first control signal; and
(c) generating a first PWM signal according to the first control signal, and controlling the switching operation of the multilevel converter according to the first PWM signal.

12. The high-voltage DC transformation apparatus according to claim 9, wherein the unidirectional rectifier module comprises a Vienna rectifier and a second controller, and the second controller is electrically connected to the Vienna rectifier for controlling the switching operation of the Vienna rectifier, thereby adjusting a voltage on the input terminal of the unidirectional rectifier module.

13. The high-voltage DC transformation apparatus according to claim 12, wherein the second controller performs a control method comprising steps of:
(a) adjusting the voltage on the input terminal of the unidirectional rectifier module according to a set voltage value on the input terminal of the unidirectional rectifier module, and generating a second current command;
(b) adjusting a current on the input terminal of the unidirectional rectifier module according to the second current command, and generating a second control signal; and
(c) generating a second PWM signal according to the second control signal, and controlling the switching operation of the Vienna rectifier according to the second PWM signal.

14. The high-voltage DC transformation apparatus according to claim 1, wherein when the high-voltage DC power generator generates power, the high-voltage DC transformation apparatus enters a grid-connected mode, and when the high-voltage DC power generator stops generating power, the high-voltage DC transformation apparatus enters an off-grid mode.

15. The high-voltage DC transformation apparatus according to claim 14, wherein when the high-voltage DC transformation apparatus enters the off-grid mode, the at least one energy storage device provides an auxiliary power required by the high-voltage DC power generator.

16. The high-voltage DC transformation apparatus according to claim 15, wherein an operating frequency of the second transformer is the same as an operating frequency of the first transformer.

17. The high-voltage DC transformation apparatus according to claim 14, wherein the bidirectional inverter module further comprises a third controller and an inverter, and when the high-voltage DC transformation apparatus enters the grid-connected mode, the third controller controls the switching operation of the inverter so as to adjust a conversion power of the bidirectional inverter module, and when the high-voltage DC transformation apparatus enters the off-grid mode, the third controller controls the switching operation of the inverter so as to adjust a voltage on the first transmission terminal of the second transformer.

18. The high-voltage DC transformation apparatus according to claim 17, wherein when the high-voltage DC transformation apparatus enters the grid-connected mode, the third controller performs a control method comprising steps of:

(a) adjusting the conversion power of the bidirectional inverter module according to a target power of the bidirectional inverter module, and generating a third current command;
(b) adjusting a current on the AC terminal of the bidirectional inverter module according to the third current command, and generating a third control signal; and
(c) generating a third PWM signal according to the third control signal, and controlling the switching operation of the inverter according to the third PWM signal.

19. The high-voltage DC transformation apparatus according to claim 17, wherein when the high-voltage DC transformation apparatus enters the off-grid mode, the third controller performs a control method comprising steps of:
(a) adjusting the voltage on the first transmission terminal of the second transformer according to a set voltage value on the first transmission terminal of the second transformer, and generating a third current command;
(b) adjusting a current on the AC terminal of the bidirectional inverter module according to the third current command, and generating a third control signal; and
(c) generating a third PWM signal according to the third control signal, and controlling the switching operation of the inverter according to the third PWM signal.

20. The high-voltage DC transformation apparatus according to claim 17, wherein the unidirectional rectifier module further comprises a Vienna rectifier and a second controller, and the second controller is electrically connected to the Vienna rectifier for controlling the switching operation of the Vienna rectifier, thereby adjusting a voltage on the output terminal of the unidirectional rectifier module.

21. The high-voltage DC transformation apparatus according to claim 20, wherein when the high-voltage DC transformation apparatus enters the off-grid mode, the second controller performs a control method comprising steps of:
(a) adjusting the voltage on the output terminal of the unidirectional rectifier module according to a set voltage value on the output terminal of the unidirectional rectifier module, and generating a second current command;
(b) adjusting a current on the input terminal of the unidirectional rectifier module according to the second current command, and generating a second control signal; and
(c) generating a second PWM signal according to the second control signal, and controlling the switching operation of the Vienna rectifier according to the second PWM signal.

22. The high-voltage DC transformation apparatus according to claim 1, wherein the energy storage device comprises a plurality of said energy storage elements and a plurality of said bidirectional inverter modules, the DC terminal of each of the plurality of bidirectional inverter modules is electrically connected to the corresponding energy storage element, the AC terminals of the plurality of bidirectional inverter modules are electrically connected together in parallel and then electrically connected to the first transmission terminal of the second transformer, and the second transmission terminal of the second transformer is electrically connected to the input terminal of the unidirectional rectifier module.

23. The high-voltage DC transformation apparatus according to claim 1, wherein the energy storage device comprises a plurality of said energy storage elements and a plurality of said bidirectional inverter modules, the DC terminal of each of the plurality of bidirectional inverter modules is electrically connected to the corresponding energy storage element, the first transmission terminal of the second transformer comprises a plurality of windings, each of the plurality of windings is electrically connected to the AC terminal of the corresponding bidirectional inverter module, and the second transmission terminal of the second transformer is electrically connected to the input terminal of the unidirectional rectifier module.

24. A power system, comprising:
at least one high-voltage DC power generator; and
a high-voltage DC transformation apparatus, electrically connected to the at least one high-voltage DC power generator, comprising:
  at least one bidirectional AC/DC conversion module, wherein a DC terminal of the bidirectional AC/DC conversion module is electrically connected to the corresponding high-voltage DC power generator;
  at least one first transformer each of that comprises a first transmission terminal and a second transmission terminal, wherein the first transmission terminal is electrically connected to an AC terminal of the corresponding bidirectional AC/DC conversion module; and
  at least one unidirectional rectifier module each of that comprises an input terminal and an output terminal, wherein the input terminal is electrically connected to the second transmission terminal of the corresponding first transformer, and the output terminal is electrically connected to a high-voltage grid;
wherein the DC transformation apparatus comprises at least one energy storage device electrically connected to the input terminal of the unidirectional rectifier module, the energy storage device comprises at least one energy storage element, at least one bidirectional inverter module and at least one second transformer, a DC terminal of the bidirectional inverter module is electrically connected to the corresponding energy storage element, a first transmission terminal of the second transformer is electrically connected to an AC terminal of the corresponding bidirectional inverter module, and a second transmission terminal of the second transformer is electrically connected to the input terminal of the unidirectional rectifier module.

* * * * *